US012688476B1

(12) United States Patent
Saha et al.

(10) Patent No.: US 12,688,476 B1
(45) Date of Patent: Jul. 21, 2026

(54) SYSTEMS AND METHODS FOR ADVANCING THE RESTORATION PROCESS FOR INTERDEPENDENT CRITICAL INFRASTRUCTURES

(71) Applicants: Namrata Saha, Miami, FL (US); Mohammadhadi Amini, Miami, FL (US); Shabnam Rezapour, Miami, FL (US)

(72) Inventors: Namrata Saha, Miami, FL (US); Mohammadhadi Amini, Miami, FL (US); Shabnam Rezapour, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 19/058,257

(22) Filed: Feb. 20, 2025

(51) Int. Cl.
| | |
|---|---|
| *G06Q 10/0637* | (2023.01) |
| *G06N 3/092* | (2023.01) |
| *G06Q 10/0635* | (2023.01) |
| *G06Q 10/067* | (2023.01) |

(52) U.S. Cl.
CPC ......... *G06Q 10/0637* (2013.01); *G06N 3/092* (2023.01); *G06Q 10/0635* (2013.01); *G06Q 10/067* (2013.01)

(58) Field of Classification Search
CPC ............. G06Q 10/0637; G06Q 10/067; G06Q 10/0635; G06N 3/092
See application file for complete search history.

(56) References Cited

U.S. PATENT DOCUMENTS

| | | | | |
|---|---|---|---|---|
| 11,595,243 | B1 * | 2/2023 | Schreiber | ............ H04L 41/0816 |
| 2009/0079562 | A1 * | 3/2009 | Ansiaux | ................. H04L 41/06 |
| | | | | 340/540 |
| 2018/0294636 | A1 * | 10/2018 | Lipke | ....................... H02H 3/08 |
| 2024/0112150 | A1 * | 4/2024 | Yu | .................... G06Q 10/06375 |

FOREIGN PATENT DOCUMENTS

| | | | | |
|---|---|---|---|---|
| CN | 114239206 A | * | 3/2022 | ............. G06F 30/18 |

OTHER PUBLICATIONS

Rajulapati, et al. Deep Learning-based Critical Infrastructure Simulation Model for Disaster Monitoring 2020 International Conference on Data Mining Workshops (ICDMW), pp. 828-835 (2020) (Year: 2020).*

* cited by examiner

*Primary Examiner* — Charles Guiliano
(74) *Attorney, Agent, or Firm* — SALIWANCHIK, LLOYD & EISENSCHENK

(57) ABSTRACT

Systems and methods are provided for advancing the restoration process for interdependent critical infrastructures (CIs) after a disaster. A modeling and solution approach can leverage the strengths of reinforcement learning (RL) to enhance the computational capability of optimization techniques to advance the restoration process. The gap can be bridged between integrative and distinct decision-making, enabling coordinated restoration planning for CIs within a decentralized decision-making context.

17 Claims, 17 Drawing Sheets

| Scenario | Features of Scenarios | | | | Policies generated by desired RLs | | | | | | Implementation bias | | |
|---|---|---|---|---|---|---|---|---|---|---|---|---|---|
| | Power CI | | Road CI | | Nominal reward for power CI | Nominal reward for road CI | Aggregated nominal reward | Actual reward for power CI | Actual reward for road CI | Aggregated actual reward | Power CI | Road CI | Aggregated benefit |
| | # of disrupted links | # of recovery teams | # of disrupted links | # of recovery teams | | | | | | | | | |
| 1 | 3 | 3 | 3 | 3 | 2800 | 5200 | 8000 | 2600 | 4000 | 6600 | 7.1% | 23.1% | 17.5% |
| 2 | 3 | 6 | 3 | 6 | 2800 | 5600 | 8400 | 2600 | 4800 | 7000 | 7.1% | 21.4% | 16.7% |
| 3 | 3 | 9 | 3 | 9 | 2800 | 5600 | 8400 | 2600 | 4800 | 7000 | 7.1% | 21.4% | 16.7% |
| 4 | 7 | 3 | 7 | 3 | 6600 | 10550 | 17150 | 5400 | 8890 | 14290 | 18.2% | 15.7% | 16.7% |
| 5 | 7 | 6 | 7 | 6 | 6990 | 10770 | 17670 | 6500 | 7450 | 13950 | 5.8% | 30.8% | 21.0% |
| 6 | 7 | 9 | 7 | 9 | 7200 | 11400 | 18600 | 6000 | 10080 | 16080 | 16.7% | 11.6% | 13.5% |
| 7 | 9 | 3 | 9 | 3 | 8500 | 20370 | 28870 | 7600 | 5760 | 13360 | 10.6% | 22.0% | 53.9% |
| 8 | 9 | 6 | 9 | 6 | 7400 | 20710 | 28110 | 5300 | 19060 | 24360 | 28.4% | 8.0% | 13.3% |
| 9 | 9 | 9 | 9 | 9 | 8300 | 19540 | 27840 | 6200 | 19540 | 25740 | 25.3% | 0.0% | 7.5% |
| 10 | 10 | 3 | 10 | 3 | 5300 | 27110 | 32610 | 2400 | 14960 | 17360 | 36.4% | 44.8% | 46.8% |
| 11 | 10 | 6 | 10 | 6 | 6100 | 26510 | 32610 | 4700 | 16790 | 21490 | 22.9% | 36.7% | 34.1% |
| 12 | 10 | 9 | 10 | 9 | 7400 | 26730 | 34130 | 6700 | 21870 | 28570 | 9.5% | 18.2% | 16.3% |
| 13 | 11 | 3 | 11 | 3 | 4200 | 43770 | 47970 | 2100 | 31060 | 33160 | 50.0% | 29.0% | 30.9% |
| 14 | 11 | 6 | 11 | 6 | 6200 | 51230 | 57430 | 4800 | 37040 | 41840 | 22.6% | 27.7% | 27.1% |
| 15 | 11 | 9 | 11 | 9 | 7300 | 55740 | 63040 | 6100 | 51010 | 57110 | 18.7% | 8.5% | 9.3% |
| 16 | 12 | 3 | 12 | 3 | 4200 | 45520 | 49720 | 2200 | 40190 | 42390 | 47.6% | 11.7% | 14.7% |
| 17 | 12 | 6 | 12 | 6 | 6500 | 48980 | 55480 | 4900 | 41020 | 45920 | 24.6% | 16.2% | 17.2% |
| 18 | 12 | 9 | 12 | 9 | 7200 | 62720 | 69920 | 6300 | 52060 | 58360 | 12.5% | 17.0% | 16.5% |

| Sets | |
|---|---|
| $G^P(N^P, L^P)$ | The power network as a directed graph with set of nodes $N^P$ and a set of links, $L^P = \{l = (n, \acute{n})\}$ where $n$ and $\acute{n} \in N^P$ |
| $N_S^P$ | The set of supply nodes that generate power |
| $N_I^P$ | The set of intermediate nodes that transfer power |
| $N_D^P$ | The set of demand nodes representing aggregated households in municipal sites |
| $N^P = N_S^P \cup N_I^P \cup N_D^P$ | The set of all nodes in power network |
| $G^R(N^R, L^R)$ | The road network as a directed graph with set of nodes, $N^R$ and a set of links, $L^R$ |
| $N^R$ | The set of all nodes in urban sites (road network) |
| $L^R$ | The set of all links (roads/highways) in urban sites (road network) |
| $N_O^R$ | The set of all origin nodes in road network |
| $N_I^R$ | The set of all intermediate nodes in road network |
| $N_D^R$ | The set of all destination nodes in road network |
| $OD$ | The set of all od pairs. $OD = \{od = (m, \acute{m}) \mid m \in N_O^R \text{ and } \acute{m} \in N_D^R\}$ |
| $\Pi_l^P$ | The set of prerequisite links in the road network that should be restored before restoring link $l \in L^P$ |
| $\Pi_l^R$ | The set of prerequisite links in the power network that should be restored before restoring link $l \in L^R$ |
| $L^P$ | The set of all links disrupted in the power network |
| $K^P = \{k^P\}$ | The set of stages in power network |
| $L_k^P$ | The set of all links disrupted in the power network at stage k |
| $\Lambda_k^P$ | The set of recovery teams in power network at stage k |
| $S_k^P$ | The set of potential states in power network |
| $A_{s_k}^P = \{a_{s_k}^P\}$ | The set of actions (all feasible subsets of links that can be selected for restoration in that state k) ($a_{s_k}^P$) in power network |
| $L^R$ | The set of all links disrupted in the road network |
| $K^R = \{k^R\}$ | The set of stages in road network |
| $L_k^R$ | The set of all links disrupted in the road network at stage k |
| $\Lambda_k^R$ | The set of recovery teams in road network at stage k |
| $S_k^R$ | The set of potential states in road network |
| $A_{s_k}^R = \{a_{s_k}^R\}$ | The set of actions (all feasible subsets of links that can be selected for restoration in that state k) ($a_{s_k}^R$) in road network |

FIG. 11A

| Variables | |
|---|---|
| $w^P_l$ | The number of teams assigned to link $l \in L^P_k$ |
| $\theta_{L^P_k}$ | The recovery time for the disrupted link of set $L^P_k$ |
| $\theta^*_{L^P_k}$ | The minimum recovery time for the disrupted link of set $L^P_k$ |
| $w^{P*}_{(n,\hat n)}$ | The optimal number of teams assigned to link $(n,\hat n) \in L^P_k$ |
| $\theta^P_k$ | The reward at stage k in power network |
| $Z^P$ | The total unfulfilled demand at the demand nodes of the power network during a day |
| $UD^P_n$ | The daily demand that cannot be fulfilled at node $n \in N^P_k$ under the link availability scenario of $\{\beta^P_l | \forall l \in L^C\}$. |
| $x^P_{l=(n,\hat n)}$ | The total power flow originating from a supply node $\forall n \in N^P_s$ |
| $y^P_{l=(\overline{\hat n, n})}$ | The movement direction of power is 1 if movement is from node $\hat n$ toward node $n$, and 0 otherwise |
| $Q$ | The expected reward matrix of taking actions in the state of the RL |
| $\pi^{P*}$ | The optimal link restoration policy for the power network |
| $w^R_{(n,\hat n)}$ | The number of teams assigned to link $(n,\hat n) \in L^R_k$ |
| $w^{R*}_{(n,\hat n)}$ | The optimal number of teams assigned to link $(n,\hat n) \in L^R_k$ |
| $\theta^R_k$ | The reward at stage k in road network |
| $\theta_{L^R_k}$ | The recovery time for the disrupted link of set $L^R_k$ |
| $\theta^*_{L^R_k}$ | The minimum recovery time for the disrupted link of set $L^R_k$ |
| $Z^R$ | The total post-disaster travel time/cost in the road network |
| $x^{R,od}_{l=(n,\hat n)}$ | The total traffic flow of each od pair for each link l |
| $\pi^{R*}$ | The optimal link restoration policy for the road network |
| $\psi^P_k$ | The time when restoration decisions are determined in stage k of the power MDP |
| $\psi^R_k$ | The time when restoration decisions are determined in stage k of the road MDP |
| $\Omega^{P,*}_k$ | The maximum Q value that is achievable in each state of each stage for power MDP |
| $\Omega^{R,*}_k$ | The maximum Q value that is achievable in each state of each stage for road MDP |

FIG. 11B

| Parameters | |
|---|---|
| $PC_n^P$ | The daily power generation capacity at each supply node ($\forall n \in N_s^P$) |
| $DD_n^P$ | The daily demand at each demand node ($\forall n \in N_D^P$) of the power network |
| $TC_l^P$ | The flow capacity for the links/cables of the power network |
| $FC_l^R$ | The traffic flow capacity of each link ($\forall l \in L^R$) |
| $TF_{od}^R$ | The traffic demand of pair $od$ ($\forall od \in OD$) |
| $T$ | Restoration horizon |
| $\bar{\sigma}_{(n,\tilde{n})}$ | The average restoration time for link $(n, \tilde{n})$ |
| $\sigma_{(n,\tilde{n})}$ | The actual restoration time for link $(n, \tilde{n})$ |
| $\underline{\sigma}_{(n,\tilde{n})}$ | Lower bound of restoration for link $(n, \tilde{n})$ as a random variable |
| $\overline{\sigma}_{(n,\tilde{n})}$ | Upper bound of restoration for link $(n, \tilde{n})$ as a random variable |
| $\beta_l^P$ | The binary parameter $\beta_l^P$ is 1 if link $l \in L^P$ is active and 0 otherwise |
| $\varsigma$ | The learning convergence in RL |
| $\gamma$ | The weight of future rewards |
| $\beta_l^R$ | The binary parameter $\beta_l^R$ is 1 if link $l \in L^R$ is active and 0 otherwise |
| $tt_{l=(n,\tilde{n})}$ | The travel time/cost for a traveler moving through link $l = (n, n') \in L^R$ |
| $ct_l^P$ | The recovery accomplishment times of restored link $l$ in power network |
| $ct_l^R$ | The recovery accomplishment times of restored link $l$ in road network |
| $C_l$ | The maximum number of teams that can work concurrently on that link $l$ |
| $\tau$ | The iterations in RL |
| $M$ | Big positive value |
| $b_l^P$ | The reactance of that link $l$ |
| $\varphi_n$ | Phase angle of node $n$ |

FIG. 11C

SYSTEMS AND METHODS FOR ADVANCING THE RESTORATION PROCESS FOR INTERDEPENDENT CRITICAL INFRASTRUCTURES

GOVERNMENT SUPPORT

This invention was made with government support under 69A3552344812, and 69A3552348317 awarded by the U.S. Department of Transportation, and 2108003 awarded by the National Science Foundation. The government has certain rights in the invention.

BACKGROUND

The proper functioning of any society heavily depends on its critical infrastructures (CIs), which are functionally interdependent. This implies that the functionality of components in one CI relies on the services provided by others. These operational interdependencies, combined with the decentralized decision-making structure of CIs and the stochastic nature of post-disaster environments, highly complicate the optimization process for restoring CIs damaged in disasters.

BRIEF SUMMARY

Embodiments of the subject invention provide novel and advantageous modeling and solution approaches for advancing the restoration process for interdependent critical infrastructures (CIs) (e.g., after a disaster). Combining and leveraging the strengths of reinforcement learning (RL) and optimization increases the modeling capability of the embodiments (e.g., to handle different types of post-disaster uncertainties) and enables decision-making in a decentralized context with several independent stakeholders with limited information-sharing willingness.

Embodiments of the subject invention bridge the gap between integrative and distinct decision-making, enabling coordinated restoration planning for CIs operating in a decentralized context. Embodiments are capable of handling (or configured to handle) post-disaster uncertainties (e.g., uncertainty in recovery times of disrupted components). Embodiments can also generate adaptive solutions that cope with post-disaster dynamics (e.g., varying numbers of recovery teams), and/or be flexible enough to handle several restoration decisions (e.g., restoration scheduling and resource allocation) simultaneously.

Embodiments of the subject invention can utilize a coordinator (or a coordinator module). A coordinator in this context is a tool or system that helps different decision-makers work together when making choices about restoring CI(s) after a disruption, such as a natural disaster or a system failure. These decision-makers are responsible for different parts of the infrastructure, such as electricity, water, or transportation, and their decisions can affect each other. That is, the coordinator helps ensure that when one part of the infrastructure is being restored, the decisions made do not interfere with, or make things worse for, the other parts. For example, if restoring the power grid depends on fixing the water supply first, the coordinator makes sure the decision-makers know that, so they don't work on fixing them in the wrong order. The coordinator allows the decision-makers to share important information with each other and consider how their actions will impact the rest of the infrastructure. The goal is to prevent or inhibit any bad decisions, such as fixing one part of the system in a way that makes it impossible or very difficult for other parts to work properly.

By coordinating, the infrastructure as a whole works better and more efficiently, helping the community recover faster and improving the CI services everyone depends on.

In an embodiment, a system for advancing the restoration process for interdependent CIs after a disaster can comprise a processor and a machine-readable medium in operable communication with the processor and having instructions stored thereon that, when executed by the processor, perform the following steps: a) receiving first data from a first CI system affected by the disaster; b) generating a first set of decisions regarding a first restoration policy for the first CI system using a first RL module; c) providing the first set of decisions to a coordinator module; d) receiving second data from a second CI system affected by the disaster, the second CI system having interdependency with the first CI system; e) providing the first set of decisions from the coordinator module to a second RL module different from the first RL module; f) generating a second set of decisions regarding a second restoration policy for the second CI system using the second RL module, the generating of the second set of decisions taking into account the first set of decisions; g) providing the second set of decisions to the coordinator module; h) providing the second set of decisions from the coordinator module to the first RL module; i) generating an updated first set of decisions regarding the second restoration policy for the first CI system using the first RL module, the generating of the updated first set of decisions taking into account the second set of decisions; j) providing the updated first set of decisions to the coordinator module; k) providing the updated first set of decisions from the coordinator module to the second RL module; l) generating an updated second set of decisions regarding the second restoration policy for the second CI system using the second RL module, the generating of the updated second set of decisions taking into account the updated first set of decisions; m) providing the updated second set of decisions to the coordinator module; n) providing the updated second set of decisions from the coordinator module to the first RL module; and o) repeating steps i)-n) a predetermined amount of times, with each iteration of step i) taking into account the most recent updated second set of decisions and each iteration of step l) taking into account the most recent updated first set of decisions, resulting in a final first set of decisions for the first restoration policy for the first CI system and a final second set of decisions for the second restoration policy for the second CI system. The instructions when executed can further performing the following step: p) providing to restoration personnel the final first set of decisions and the final second set of decisions, allowing the restoration personnel to implement the first restoration policy for the first CI system for the second restoration policy for the second CI system. The restoration personnel can include, for example, at least one first restoration crew for the first CI and at least one second restoration crew for the second CI. The system can further comprise a display in operable communication with the processor and/or the machine-readable medium. The instructions when executed can further performing the following step: q) displaying on the display the final first set of decisions, the final second set of decisions, the first restoration policy (based on the final first set of decisions), and/or the second restoration policy (based on the final second set of decisions). Each of the first CI system and the second CI system can be any CI system that may be affected by a disaster (for example, a power system or a road system). The coordinator module can comprise a feasibility module (FM) and a prediction module (PM). The FM can be configured to: store the first set of decisions and each updated iteration thereof, and the second set of decisions and each updated iteration thereof; share the first set of decisions and each updated iteration thereof with the second RL module to inhibit the second RL module from generating an infeasible decision as part of any iteration of the second set of decisions; and/or share the second set of decisions and each updated iteration thereof with the first RL module to inhibit the first RL module from generating an infeasible decision as part of any iteration of the first set of decisions. The PM module can be configured to: generate an estimation of a maximum reward that is achievable for each iteration of the first set of decisions; generate an estimation of a maximum reward that is achievable for each iteration of the second set of decisions; share with the second RL the estimation of the maximum reward that is achievable for each iteration of the first set of decisions, such that the second RL optimizes an aggregated reward at each iteration of the second set of decisions by taking into account the estimation of the maximum reward that is achievable for a current iteration of the first set of decisions; and/or share with the first RL the estimation of the maximum reward that is achievable for each iteration of the second set of decisions, such that the first RL optimizes the aggregated reward at each iteration of the first set of decisions by taking into account the estimation of the maximum reward that is achievable for a current iteration of the second set of decisions. The aggregated reward can be, for example, a summation of rewards achieved by the first RL and the second RL. The aggregated reward can be determined using a modified version of Bellman's equation (see also, e.g., equation (16) herein and/or the equation at page 12 herein). The performing of steps b), f), i), and/or l) can comprise using an ε-greedy approach. The predetermined amount of times in step o) can be, for example, at least 3, at least 5, at least 10, at least 50, at least 100, at least 1000, at least 10000, or in a range of from 2-1,000,000 (or any value or subrange contained therein). The disaster can be, for example, a thunderstorm, hail, lightning, a tornado, and/or a hurricane. Though the case with two CIs is discussed in detail, the system can be applied to any number of interdependent CIs by extending the concept of a dedicated RL module for each CI system and using the coordinator module to communicate between RL modules.

In another embodiment, a method for advancing the restoration process for interdependent CIs after a disaster can comprise: a) receiving (e.g., by a processor) first data from a first CI system affected by the disaster; b) generating (e.g., by the processor) a first set of decisions regarding a first restoration policy for the first CI system using a first reinforcement learning (RL) module; c) providing (e.g., by the processor) the first set of decisions to a coordinator module; d) receiving (e.g., by the processor) second data from a second CI system affected by the disaster, the second CI system having interdependency with the first CI system; e) providing (e.g., by the processor) the first set of decisions from the coordinator module to a second RL module different from the first RL module; f) generating (e.g., by the processor) a second set of decisions regarding a second restoration policy for the second CI system using the second RL module, the generating of the second set of decisions taking into account the first set of decisions; g) providing (e.g., by the processor) the second set of decisions to the coordinator module; h) providing (e.g., by the processor) the second set of decisions from the coordinator module to the first RL module; i) generating (e.g., by the processor) an updated first set of decisions regarding the second restoration policy for the first CI system using the first RL module, the generating of the updated first set of decisions taking into account the second set of decisions; j) providing (e.g., by the processor) the updated first set of decisions to the coordinator module; k) providing (e.g., by the processor) the updated first set of decisions from the coordinator module to the second RL module; l) generating (e.g., by the processor) an updated second set of decisions regarding the second restoration policy for the second CI system using the second RL module, the generating of the updated second set of decisions taking into account the updated first set of decisions; m) providing (e.g., by the processor) the updated second set of decisions to the coordinator module; n) providing (e.g., by the processor) the updated second set of decisions from the coordinator module to the first RL module; and o) repeating (e.g., by the processor) steps i)-n) a predetermined amount of times, with each iteration of step i) taking into account the most recent updated second set of decisions and each iteration of step l) taking into account the most recent updated first set of decisions, resulting in a final first set of decisions for the first restoration policy for the first CI system and a final second set of decisions for the second restoration policy for the second CI system. The method can further comprise: p) providing (e.g., by the processor) to restoration personnel the final first set of decisions and the final second set of decisions, allowing the restoration personnel to implement the first restoration policy for the first CI system for the second restoration policy for the second CI system. The restoration personnel can include, for example, at least one first restoration crew for the first CI and at least one second restoration crew for the second CI. The method can further comprise: q) performing, by the restoration personnel, the first restoration policy for the first CI system for the second restoration policy for the second CI system (e.g., at least one first restoration crew can perform the first restoration policy for the first CI system and/or at least one second restoration crew can perform the second restoration policy for the second CI system. The method can further comprise: r) displaying (e.g., on a display in operable communication with the processor) the final first set of decisions, the final second set of decisions, the first restoration policy (based on the final first set of decisions), and/or the second restoration policy (based on the final second set of decisions). Each of the first CI system and the second CI system can be any CI system that may be affected by a disaster (for example, a power system or a road system). The coordinator module can comprise a feasibility module (FM) and a prediction module (PM). The FM can be configured to: store the first set of decisions and each updated iteration thereof, and the second set of decisions and each updated iteration thereof; share the first set of decisions and each updated iteration thereof with the second RL module to inhibit the second RL module from generating an infeasible decision as part of any iteration of the second set of decisions; and/or share the second set of decisions and each updated iteration thereof with the first RL module to inhibit the first RL module from generating an infeasible decision as part of any iteration of the first set of decisions. The PM module can be configured to: generate an estimation of a maximum reward that is achievable for each iteration of the first set of decisions; generate an estimation of a maximum reward that is achievable for each iteration of the second set of decisions; share with the second RL the estimation of the maximum reward that is achievable for each iteration of the first set of decisions, such that the second RL optimizes an aggregated reward at each iteration of the second set of decisions by taking into account the estimation of the maximum reward that is achievable for a current iteration of the first set of decisions; and/or share with the first RL the estimation of the maximum reward that is achievable for each iteration of the second set of decisions, such that the first RL optimizes the aggregated reward at each iteration of the first set of decisions by taking into account the estimation of the maximum reward that is achievable for a current iteration of the second set of decisions. The aggregated reward can be, for example, a summation of rewards achieved by the first RL and the second RL. The aggregated reward can be determined using a modified version of Bellman's equation (see also, e.g., equation (16) herein and/or the equation at page 12 herein). The performing of steps b), f), i), and/or l) can comprise using an ε-greedy approach. The predetermined amount of times in step o) can be, for example, at least 3, at least 5, at least 10, at least 50, at least 100, at least 1000, at least 10000, or in a range of from 2-1,000,000 (or any value or subrange contained therein). The disaster can be, for example, a thunderstorm, hail, lightning, a tornado, and/or a hurricane. Though the case with two CIs is discussed in detail, the method can be applied to any number of interdependent CIs by extending the concept of a dedicated RL module for each CI system and using the coordinator module to communicate between RL modules.

BRIEF DESCRIPTION OF DRAWINGS

FIG. 9 shows a table of table of implementation bias of uncoordinated restoration policies generated for interdependent CIs.

FIG. 10 shows a table of actual rewards of coordinated and uncoordinated restoration policies.

FIG. 11A shows a table of notation used herein for sets.

FIG. 11B shows a table of notation used herein for variables.

FIG. 11C shows a table of notation used herein for parameters.

DETAILED DESCRIPTION

Figure 1A:
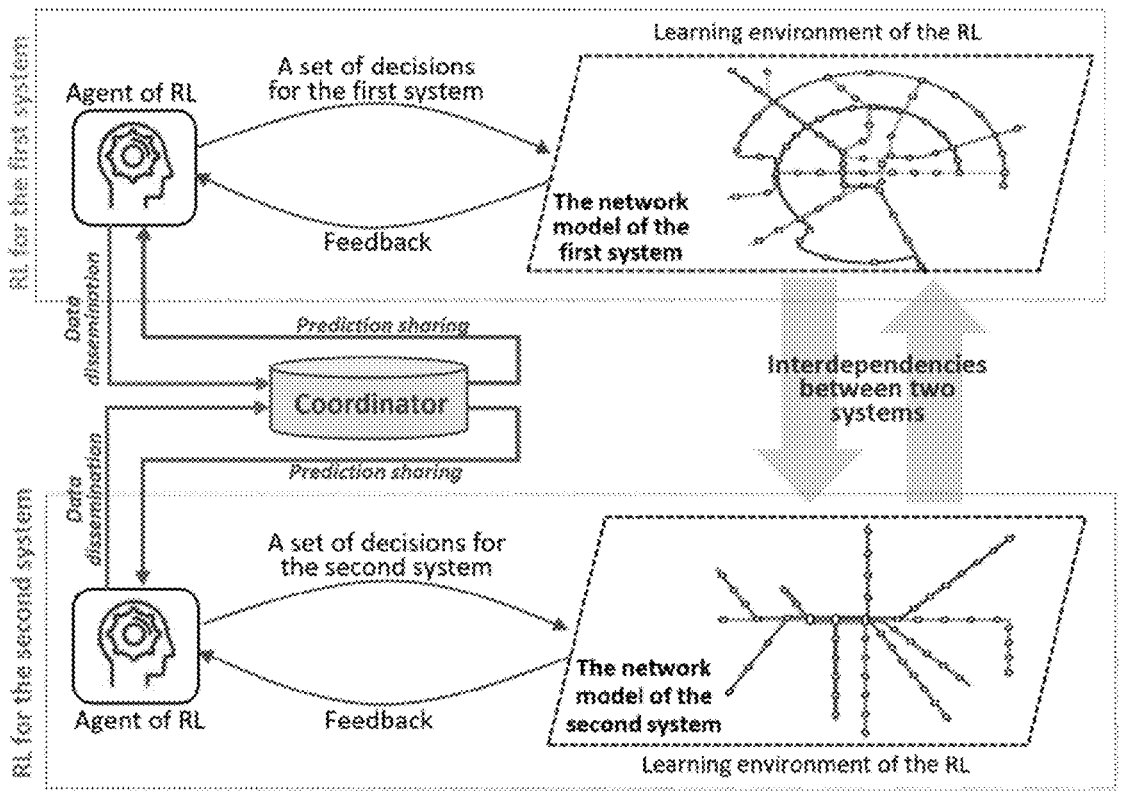
FIG. 1A shows the structure of a coupled reinforcement learning (RL) paradigm, according to an embodiment of the subject invention.

Embodiments of the subject invention provide novel and advantageous systems and methods for advancing the restoration process for interdependent critical infrastructures (CIs) (e.g., after a disaster). A modeling and solution approach can leverage the strengths of reinforcement learning (RL) to enhance the computational capability of optimization techniques to advance the restoration process. Embodiments can bridge the gap between integrative and distinct decision-making, enabling coordinated restoration planning for CIs within a decentralized decision-making context. Embodiments can be capable of handling (or configured to handle) post-disaster uncertainties (e.g., uncertainty in recovery times of disrupted components). Embodiments can also generate adaptive solutions that cope with post-disaster dynamics (e.g., varying numbers of recovery teams), and/or be flexible enough to handle several restoration decisions (e.g., restoration scheduling and resource allocation) simultaneously.

The development of an efficient restoration policy for CIs is mandatory to enhance the resilience of communities against disruptive events. Recently, the increasing interconnections among CIs have rendered them more vulnerable to disruptive events, complicating their restoration efforts. CIs within a community are functionally interdependent, meaning the functionality of components in one CI depends on the services provided by other CIs. These interdependencies cause disruptions to cascade across communities. For example, a disruption in the power CI can lead to a wastewater treatment plant in the wastewater CI losing power and becoming inoperative, illustrating the propagation of disruptions across CIs. Similarly, restoration operations in CIs are interdependent. For instance, clearing roads from fallen trees in a road CI may only be possible after removing fallen power cables from the roads, a task carried out by the restoration crew of the power CI. This emphasizes the procedural interdependencies between restoration operations of CIs and underscores the importance of concurrent restoration planning.

In practice, restoration efforts for CIs often disregard procedural interdependencies and are typically planned independently, with little to no communication. The restoration of CIs is conducted in challenging post-disaster environments. Due to resource scarcity following a disaster (e.g., limited facilities, supplies, and manpower) the restoration of disrupted components cannot be initiated simultaneously. Resource constraints typically lead to sequential restoration efforts that extend throughout the disaster response phase. All restoration activities occur in chaotic post-disaster situations characterized by varying levels of uncertainty and dynamism, such as uncertain damage levels and restoration times for disrupted components and the dynamic number of facilities and recovery crews available for restoration. These facts highlight the importance of developing modeling and solution techniques to address the necessity of generating sequential, stochastic, and adaptive restoration policies for CIs. These complexities are compounded in the concurrent restoration of interdependent CIs.

Figure 1B:
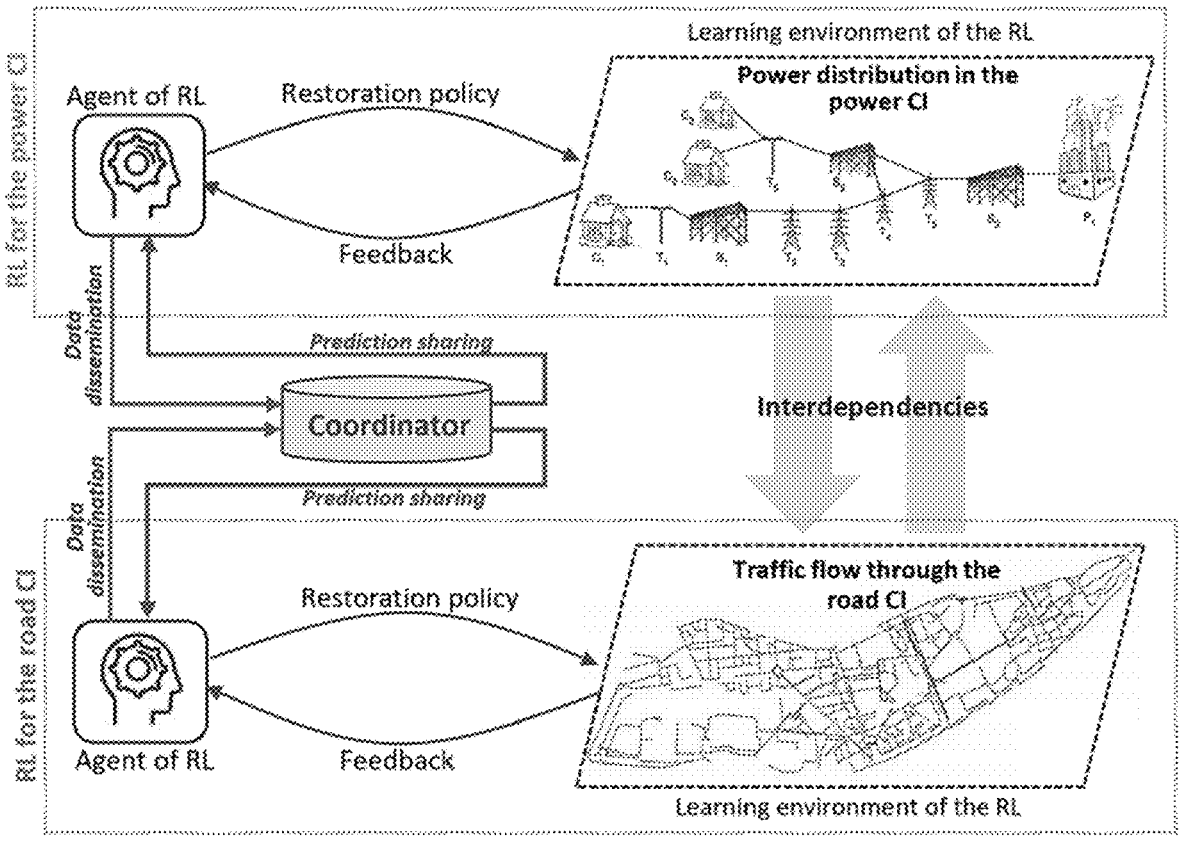
FIG. 1B shows the structure of a coupled RL mechanism for road and power critical infrastructures (CIs), according to an embodiment of the subject invention.
Figure 1C:
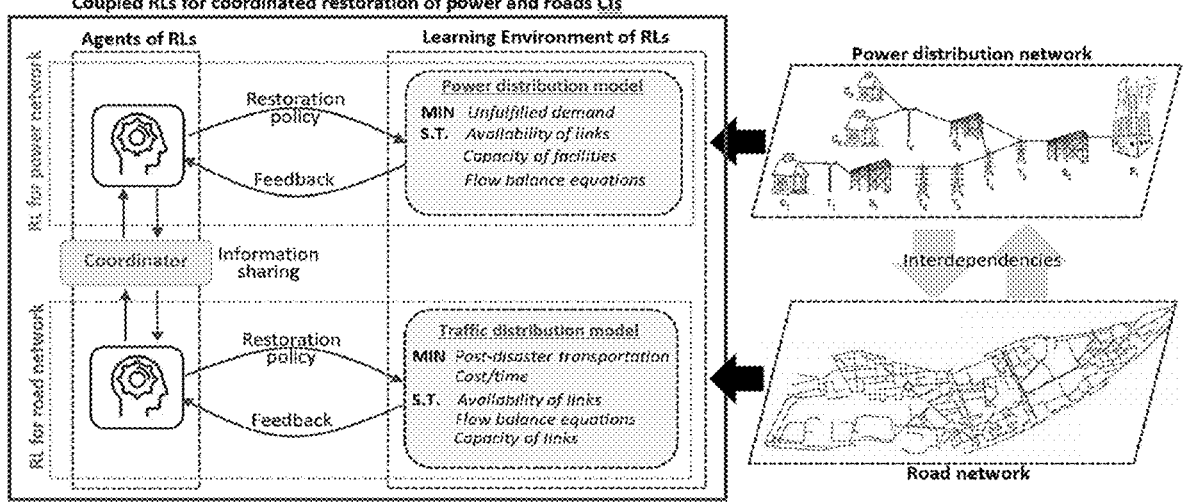
FIG. 1C shows the structure of a coupled RL mechanism, according to an embodiment of the subject invention.

Embodiments of the subject invention provide a modeling and solution mechanism for generating coordinated restoration policies for interdependent CIs. The restoration decisions of CIs are made in a decentralized context, recovery times of disrupted components are stochastic, and the number of recovery teams in both CIs varies over time. As illustrated in FIGS. 1A-1C, this mechanism comprises a set of RLs coupled through a "coordinator" component to facilitate information sharing and coordinated decision-making for CI restorations. Each RL corresponds to a CI and addresses its restoration decisions, aligning with the decentralized nature of the problem. The "coordinator" assists RL agents in partially exchanging restoration information, preventing or inhibiting them from making infeasible (or non-executable) decisions and enabling the evaluation of the consequences of their decisions on other CIs. Additionally, RLs can effectively handle uncertainties (e.g., uncertainty in recovery times) and dynamisms (e.g., varying number of recovery teams) arising from the lack of complete information in chaotic post-disaster circumstances.

Embodiments of the subject invention provide a set of RL mechanisms (or modules), that are coupled through a "coordinator" component to facilitate partial information sharing and coordinated decision-making for a set of interdependent but autonomous systems, controlled by separate decision-makers. The RL mechanisms can be referred to herein as "RLs", "RL modules", or "RL agents" (or individually as "RL", "RL mechanism", "RL agent", or "RL module"). Each RL can correspond to a system (of the set of interdependent but autonomous systems) and make its decisions, aligning with the decentralized decision-making nature of the problem. The "coordinator" can assist RL agents in partially exchanging information, preventing or inhibiting them from making infeasible decisions (that are not executable due to the system interdependencies) and enabling the evaluation of the consequences of their decisions on other interdependent systems (e.g., to make coordinated decisions that benefit all systems rather than distinct decisions that only benefit a single system). Additionally, the approach can effectively handle uncertainties and dynamisms may happen in the working contexts of systems.

When optimization is employed to enhance decision-making for interdependent systems, its predominant assumption is typically centralization, where a single decision-maker possesses complete information and dictates decisions for all systems. However, this approach overlooks the autonomy of individual systems. Addressing this limitation, embodiments of the subject invention provide tools and algorithms that can: (1) bridge the gap between centralized and distinct decision-making, facilitating coordinated decision-making among a group of decentralized but interdependent systems (DISs) operating within a decentralized framework; (2) adeptly manage uncertainties inherent in the systems and model robust decisions; and (3) generate adaptable decisions capable of navigating the evolving dynamics of the systems.

Embodiments of the subject invention provide a modeling technique and a solution algorithm to make coordinated and synergistic decisions for a set of heterogeneous, autonomous, yet interdependent systems (HAISs). A HAIS set includes systems working in heterogeneous (e.g., physical, social, cyber, and/or technical) context, controlled by separate decision-makers, but having significant performance interdependencies. Within this intricate arrangement, the behavior and performance of one system intricately intertwine with those of others. A HAIS set finds prominent applications in the contemporary world, including cyber-physical-social systems, the Internet of Things (IoT), and supply chains. Embodiments of the subject invention can be widely used to optimize decisions for HAIS sets.

There are several factors that highly complicate decision-making procedure for a HAIS set, including: decentralized decision-making structure of systems; lack of information sharing willingness among systems; operational interdependencies among systems; heterogeneous working contexts of systems that necessitates various modeling techniques; and working contexts of systems may include a wide range of uncertainties and dynamisms. No existing decision-making technique in the operations research (OR) field can simultaneously address all of these features. Embodiments of the subject invention empower OR decision-making techniques with RL strengths and provides a modeling and solution approach that is able to bridge the gap between integrative and distinct decision-making in OR (enabling coordinated decision-making for a HAIS set within a decentralized context), preserve the privacy of systems by minimizing information sharing, handle various uncertainties in the working context of systems and make robust decisions that are insensitive to these variations, and generate adaptive solutions that cope with systems' dynamics.

Systems of embodiments of the subject invention, which can be referred to as a coupled RL (or RLs) paradigm or a coupled RL (or RLs) mechanism, can include of a set of RLs (one RL for each system). The RLs can be linked via a central "coordinator" component. This coordinator can serve as the nexus for information exchange, enabling synchronized decision-making among the systems. Within this coupled RL mechanism, the coordinator plays a pivotal role in harmonizing the decisions of individual agents, preventing or inhibiting them from making conflicting decisions and ensuring their collective coherence.

The coordinator can include a feasibility module (FM) and a prediction module (PM). After making each decision by each RL, the information of the decision can be stored in the FM module. This information can be available for the agents of other RLs and can prevent or inhibit them from making infeasible decisions for their own systems. The PM can share the best available estimation of the maximum reward that is achievable in each state of each RL stage with agents of other RLs. This information can help those agents predict the consequences of their decisions in each stage on interdependent systems and select decisions that result in better aggregated rewards (summation of rewards achieved by the agent and the agents of its interdependent systems) rather than individual rewards.

After designing and embedding the "coordinator" among the RL agents, the impacts of its modules on the decisions made by the agents of RLs can include information sharing through FM, feasibility checking through FM, and consequence predicting through PM. With respect to information sharing through FM, after making a set of decisions for a system in each stage of its corresponding RL, the information of the decisions and their impacts on the system's performance can be recorded in the FM module of the "coordinator". With respect to feasibility checking through FM, before making a new set of decisions in each stage of an RL, the feasibility of these decisions can be checked with the FM module. If the prerequisites of these decisions have already been provided in the other systems, the decisions can be considered feasible and can be selected in that stage. The agents of RLs may only be permitted to select feasible sets of decisions in their RL stages. With respect to consequence predicting through PM, the PM can help the agent of each RL predict the consequences of its decisions on interdependent systems. This can guide them to make coordinated, rather than distinct, decisions because they will consider the impacts of their decisions not only on their own system but also on the interdependent systems. For this purpose, the PM can record the maximum reward that is achievable in each state of each RL stage. These values are not fixed and can be updated in the iterations of RLs. To employ these predictions in the decision-making process of agents, the Bellman's equation can be revised as follows.

$$Q^{\tau+1}\left(s_k^1, a_{s_k}^1\right) =$$

$$(1 - \xi)Q^\tau\left(s_k^1, a_{s_k}^1\right) + \xi\left[\theta_k^1\left(a_{s_k}^1\right) = \gamma \max_{a_{s_{k+1}}^1} Q^\tau\left(s_{k+1}^1, a_{s_{k+1}}^1\right) + \lambda MQ^{2,\tau}\left(s_k^2\right)\right]$$

In the revised Bellman's equation above, $$Q^\tau\left(s_k^1, a_{s_k}^1\right)$$

represents the counter-cumulative reward achievable in state $$s_k^1$$

of the first RL if decision $$a_{s_k}^1$$

is selected by its agent. This is the best estimation made up to iteration $\tau$;

$$\theta_k^1\left(a_{s_k}^1\right)$$

represents the reward achieved in iteration $\tau$ by the agent of the first RL after making decision $$a_{s_k}^1; \max_{a_{s_{k+1}}^1} Q^\tau\left(s_{k+1}^1, a_{s_{k+1}}^1\right)$$

represents the maximum achievable counter-cumulative reward in the next stage of the first RL if decision $$a_{s_k}^1$$

is selected by its agent;

$$MQ^{2,\tau}\left(s_k^2\right)$$

represents the best achievable counter-cumulative reward in the second RL if decision $$a_{s_k}^1$$

is selected by the agent of the first RL; $\gamma$ demonstrates the importance of future rewards for the agent of the first RL; $\xi$ demonstrates the convergence speed of the learning process; and $\lambda$ demonstrates the importance of the rewards achievable in the second RL for the agent of the first RL. According to the revised Bellman's equation above, the agent of the each RL not only considers the impact of the decisions made at each stage on the future achievable rewards in its own system $$\left(\max_{a_{s_{k+1}}^1} Q^\tau\left(s_{k+1}^1, a_{s_{k+1}}^1\right)\right)$$

but also considers the sequence of these decisions on the maximum achievable reward in the other system $$\left(MQ^{2,\tau}\left(s_k^2\right)\right).$$

In a first iteration, a sequence of decisions in the coupled RL mechanism that is designed for a sample HAIS set with only two systems can be as follows (see also FIG. 2).

Step 1: Using the $\varepsilon$-greedy approach and considering empty FM and PM, the agent of the first RL makes the first set of decisions for the first stage of the first system. After making these decisions, the information of the selected decisions and their consequences on the first system will be added to the FM. After updating reward values using the revised Bellman's equation above, these estimations will be added to the PM as the best rewards achievable in the first stage of the first RL.

Step 2: Then, using the E-greedy approach and considering the updated FM and PM in Step 1, the agent of the second RL makes the first set of feasible decisions for the first stage of the second system. The feasibility of these decisions will be checked with the FM updated in Step 1. The information of the selected decisions and their consequences on the performance of the second system will be added to the FM. After updating reward values for the second system using the revised Bellman's equation above, this information will be added to the PM as the best rewards achievable in the first stage of the second RL.

Step 3: Then, considering the updated FM (including the decisions have made so far for the first and second systems) and PM (including the rewards achievable in the first stages of the first and second systems), the agent of the first RL makes the second set of decisions for the second system using the $\varepsilon$-greedy approach. The feasibility of these decisions will be checked with the FM updated in Step 2. The information of these decisions is added to the FM and used to update reward estimations for the second stage of the first system. The new reward estimations are added to the PM.

Step 4: This procedure continues iteratively for all stages in the coupled RLs paradigm. In the other iterations, all the calculations will be the same, but the reward values of the previous iteration will substitute the zero reward values that we start with in the first iteration.

The decision-making approach for concurrent restoration of interdependent CIs can be centralized or decentralized. Embodiments can provide solutions in the decentralized setting, optimizing restoration scheduling in the presence of uncertainties and resource allocation under dynamic number of recovery teams. The restoration scheduling problem determines the restoration sequence/concurrency of disrupted components, and the resource allocation problem decides how to assign limited recovery resources (restoration crews, facilities, machinery, etc.) to the disrupted components.

Related art systems typically use techniques within a centralized context to attempt to restore CIs, in which the interdependent CI restoration problem is considered in a centralized context in which all CIs are controlled by a single authority. A main difference between these related art systems and embodiments of the subject invention is that embodiments of the subject invention provide a systematic modeling and solution approach capable of generating (or configured to generate) coordinated restoration policies for interdependent CIs in a decentralized context.

Related art systems are typically limited to optimizing the restoration schedule when attempting to restore interdependent CIs, and this involves sequencing and prioritizing disrupted components. However, these related art systems overlook resource allocation decisions, neglecting the possibility of assigning multiple recovery teams to critical disrupted components that play a significant role in the restoration process. In contrast, embodiments of the subject invention generate policies that include both restoration scheduling and resource allocation decisions. Resource allocation decisions enable the assignment of more than one recovery team to vital disrupted components with a significant role in the restoration process.

The related art includes no systematic modeling and solution approach for concurrently restoring interdependent CIs in a decentralized context. Embodiments of the subject invention address this methodological gap by providing a modeling and solution approach capable of meeting (or configured to meet) the following requirements for interdependent CIs: restoration decisions of CIs are made in a decentralized context (by separate decision-makers) but are coordinated through information sharing among CIs; preserving privacy of CIs by minimizing information sharing; and being flexible enough to simultaneously optimize scheduling and resource allocation decisions in the restoration process of CIs.

Related art systems that attempt restoration of CIs often rely on simplifying assumptions regarding data availability, problem formulation, and solution development. Embodiments of the subject invention introduce enhanced flexibility in modeling and optimizing post-disaster CI restoration operations, allowing for realistic scenarios and/or assumptions.

In the aftermath of a disaster, the environment is often chaotic, characterized by numerous uncertainties arising from incomplete information. However, related art systems operate under deterministic assumptions. Embodiments of the subject invention can use a real-time damage assessment mechanism and/or can consider uncertainty in damage levels and required recovery times to significantly increase modeling accuracy. This avoids or minimizes sub-optimality or even infeasibility of generated restoration policies when nominal values are not materialized for those parameters.

Related art systems do not include: a systematic modeling approach for CI restoration that can address complexities of post-disaster circumstances (e.g., restoration uncertainties) without imposing unrealistic simplifying assumptions; or a generalizable solution approach to make a wide range of restoration decisions (e.g., restoration scheduling and resource allocation) for CI restorations. The modeling and solution approach of embodiments of the subject invention can address the aforementioned gaps in the at least the following ways: (1) being capable of handling (or configured to handle) post-disaster uncertainties (e.g., uncertainty in recovery times of disrupted components); generating adaptive solutions that cope with post-disaster dynamics (e.g., varying numbers of recovery teams); and being flexible enough to handle several restoration decisions (e.g., restoration scheduling and resource allocation) simultaneously.

Restoration for Road and Power CIs

Without sacrificing generality, a discussion will follow on an embodiment for developing coordinated restoration policies for interdependent road and power CIs. The structure of the disrupted road and power CIs, the restoration decisions that will be made for each CI, and their interdependencies are explained below. However, the mathematical and computational foundations of the approach can be extended to any pair of interdependent CIs managed within a decentralized context.

A network can be used to represent the power CI in the community: $G^P(N^P, L^P)$. The set of nodes in the network includes supply nodes that general power $$(N_S^P),$$

intermediate nodes that transfer power $$(N_I^P),$$

and demand nodes representing aggregated households in municipal sites $$(N_D^P): N^P = N_S^P \cup N_I^P \cup N_D^P.$$

These nodes are connected through cables represented as links in the network, $l=(n, \acute{n})$ where n and $\acute{n} \in N^P$. The daily power generation capacity at each supply node is denoted by $$PC_n^P (\forall n \in N_S^P).$$

The parameter $$DD_n^P (\forall n \in N_D^P)$$

represents the daily demand at the demand nodes of the network. Additionally, there is a flow capacity for the links/cables of the network represented by $$TC_l^P (\forall l \in L^P).$$

Under power generation and transmission limitations, the power distribution plan in a power CI determines how the daily generated power at the supply nodes should be routed throughout the network to fulfill the daily demands materialized at the demand nodes.

Extreme events (e.g., thunderstorms, hail, lightning, tornados, and hurricanes) may damage the power CI by disrupting some of the links (e.g., downing some power lines) in the network. This may distort its power distribution plan and leave some of the demand nodes out-of-power. A restoration schedule for a power CI determines the sequence or concurrency of restoring disrupted links in the network to minimize the total unfulfilled power demand during the restoration period, represented by T. Limitation of restoration teams, uncertainty in the recovery times of disrupted links, and restoration dependency between the road and power CIs are the key barriers complicating restoration optimization for power CIs.

The road CI in the community is represented by another network, $G^R(N^R, L^R)$, in which urban sites constitute nodes of the network $(N^R)$ connected through roads/highways represented by links $(L^R)$. Each link has a traffic flow capacity $$(FC_l^R, \forall l \in L^R).$$

When an extreme event damages the road CI, some roads/highways become disrupted and impassable, decelerating the post-disaster traffic flow in the affected area. The post-disaster traffic need is represented as a set of origin-destination (OD) pairs, where OD pairs correspond to daily traffic flow moving from origin $$(N_O^R)$$

to destination $$(N_D^R)$$

nodes of the road CI through intermediate nodes $$(N_I^R): OD = \left\{ od = \left(m, \acute{m}\right) \middle| m \in N_O^R \text{ and } \acute{m} \in N_D^R \right\}.$$

The traffic demand of pair od is denoted by $$TF_{od}^R(\forall\, od \in OD).$$

Developing a restoration schedule for a road CI involves strategizing the sequence or concurrent restoration of disrupted roads to optimize the acceleration of post-disaster traffic flow within the restoration period, T. This optimization process must account for constraints such as limited resources (e.g., a finite number of recovery teams) and uncertainties such as incomplete information regarding the recovery time of blocked or damaged roads and highways.

Several sets can be defined to model restoration interdependency between the road and power CIs.

$$\Pi_l^P$$

includes the set of prerequisite links in the road CI that should be restored before restoring link $l \in L^P$. Similarly, $$\Pi_l^R$$

includes the set of prerequisite links in the power CI that should be restored before restoring link $l \in L^R$. A goal is to coordinately optimize the restoration plans for the damaged power and road CIs, considering their interdependencies, to minimize the total unfulfilled power demand in the power CI and travel time/cost in the road CI. The restoration decisions for CIs are made in a decentralized context by separate decision-makers.

Figure 2:
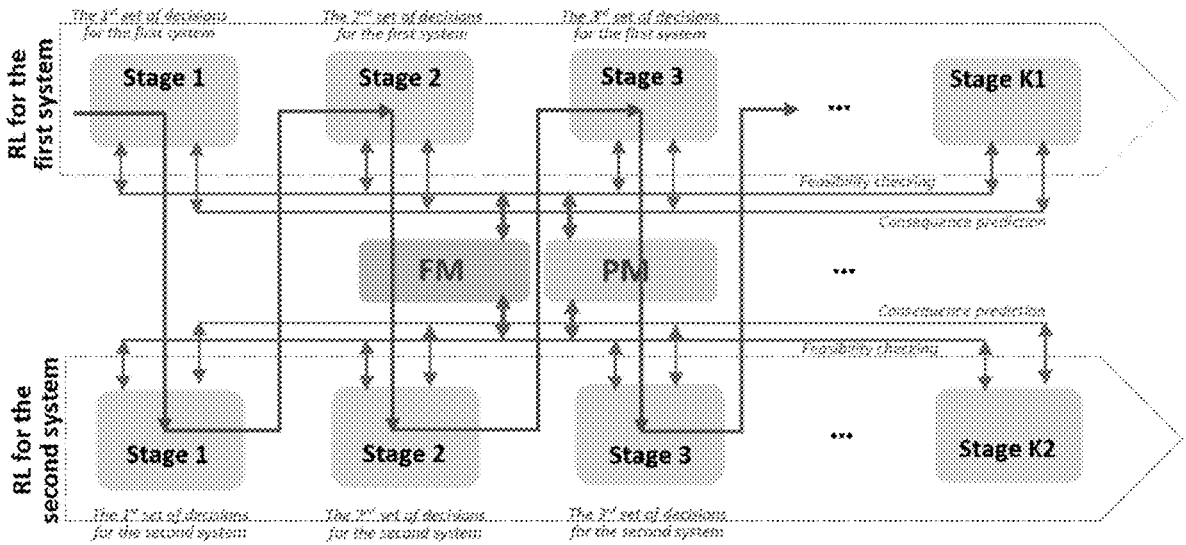
FIG. 2 shows a decision-making procedure for a coupled RL paradigm, according to an embodiment of the subject invention.

FIG. 2 demonstrates the general structure of the approach developed to generate coordinated restoration policies for the road and power CIs, referred to as the coupled RLs mechanism. This mechanism includes an RL with a separate agent and learning environment for each CI. The agent of each RL makes restoration decisions of its corresponding CI. Having a separate agent for each CI is consistent with the decentralized nature of the problem. Having a separate learning environment for each agent enables us to handle the heterogeneous operating context of CIs. To harmonize the decisions of agents and generate coordinated policies, a "coordinator" can be designed and located to facilitate limited information sharing among the RL agents. Connecting agents of the RLs through the "coordinator" results in the coupled RLs mechanism that can make coordinated restoration decisions for the power and road CIs.

RL is a machine learning technique including an agent and a learning environment. It trains the agent by using feedback from the learning environment to guide the agent toward optimal solutions. RL mimics the trial-and-error learning process employed by humans to achieve their goals (see also Li, Reinforcement Learning for Sequential Decision and Optimal Control (First ed.), Springer Verlag, Singapore, pp. 1-460, 2023; which is hereby incorporated herein by reference in its entirety).

In the presence of limited recovery resources (e.g., limited recovery teams or facilities), the agent of the power RL should determine the best sequence and concurrency for recovering disrupted links in the power network. Therefore, the problem of restoration scheduling and resource allocation by the agent can be formulated as a Markov Decision Process (MDP) with sequential decision-making stages.

In the context of the power network, let $L^P$ be the set of disrupted links. At each decision-making stage of the power MDP $(\forall k^P \in K^P)$, the agent is tasked with two key decisions: (1) selecting a subset of disrupted links for restoration $$\left(\acute{L}_k^P \subset \acute{L}^P\right);$$

and (2) allocating recovery teams $$(\Lambda_k^P)$$

available at stage $k^P$ to the links selected for restoration in that stage.

The process of allocating recovery teams to a subset of links $$\left(\acute{L}_k^P\right)$$

that can be selected for restoration at stage $k^P$ is explained the next section, addressing resource allocation decisions. The process of selecting the best subset of links for restoration in each stage will be explained below, addressing restoration scheduling decisions.

With respect to resource allocation decisions, the recovery time needed to restore each link in set $$\acute{L}_k^P$$

depends on the number of recovery teams allocated to that link. This resource allocation process aims to minimize the restoration time for the selected links in $$\acute{L}_k^P,$$

ensuring their swift recovery. The notation used herein are summarized in the tables in FIGS. 11A-11C.

The variable $$w_l^P$$

indicates the number of teams allocated to link $$l \in \acute{L}_k^P,$$

while $\overline{\sigma}_l$ demonstrates the average restoration time for link l if only one team were allocated to it (where $\sigma_l$ is a random variable ranging from $\check{\sigma}_l$ to $\hat{\sigma}_l$). The optimal allocation of teams to the links in set $$\acute{L}_k^P$$

is determined by the following model.

$$\text{Minimize } \vartheta_{\acute{L}_k^P} = \underset{\forall l \in \acute{L}_k^P}{\text{MAX}} \vartheta^l = \left(\frac{\overline{\sigma}_l}{w_l^P}\right) \tag{1}$$

$$\text{Subject to: } w_l^P \le C_l \quad \forall l \in \acute{L}_k^P \tag{2}$$

$$\sum_{l \in \acute{L}_k^P} w_l^P \le \Lambda_k^P \tag{3}$$

$$w_l^P \ge 0 \text{ and integer} \quad \forall l \in \acute{L}_k^P \tag{4}$$

Objective function (1) aims to optimize the allocation of recovery teams to the selected links for restoration $$(\acute{L}_k^P),$$

minimizing the maximum required time for their recovery. It is assumed that the allocated teams will remain dedicated to their assigned links throughout the recovery process, and the restoration of links in $$\acute{L}_k^P$$

will be considered complete once all selected links are restored. Constraint (2) ensures that the number of allocated teams to each link does not exceed the maximum number of teams that can work simultaneously on that link $(C_l)$. Additionally, constraint (3) guarantees that the number of allocated teams at stage k does not exceed the total number of available teams at that stage $$(\Lambda_k^P).$$

The process of linearizing and solving model (1-4) is explained as follows.

Initially, objective function (1) can be replaced with $$\text{``Min } \vartheta_{\acute{L}_k^P}\text{''}$$

and constraint (B2) can be incorporated into the model.

$$\text{Min } \vartheta_{\acute{L}_k^P} \tag{B1}$$

$$\text{S.T. } \vartheta_{\acute{L}_k^P} \ge \frac{\overline{\sigma}_l}{w_l^P} \qquad \forall l \in \acute{L}_k^P \tag{B2}$$

$$w_l^P \le C_l \qquad \forall l \in \acute{L}_k^P \tag{B3}$$

$$\sum_{l \in \acute{L}_k^P} w_l^P \le \Lambda_k^P \tag{B4}$$

$$w_l^P \ge 0 \text{ and integer} \quad \forall l \in \acute{L}_k^P \tag{B5}$$

Next, to linearize the model, the set of all possible numbers of teams that can be assigned to link l can be defined as $\Phi_l = \{1, 2, 3, \ldots, C_l\}$. A binary variable $$v_\theta^l$$

can be introduced, where $$v_\theta^l = 1 \text{ if } \theta \in \Phi_l$$

crews are assigned to link l, and $$v_\theta^l = 0$$

otherwise Consequently, the term $$\frac{\sigma_l}{w_l^P}$$

can be replaced with $$\left(\frac{\sigma_l}{1v_1^l + 2v_1^l + \ldots + C_1 v_{C_1}^l}\right)$$

and constraint $$\sum_{l \in \acute{L}_k^P} w_l^P \le \Lambda_k^P \text{ with } \sum_{l \in \acute{L}_k^P} \sum_{\theta \in \Phi_l} \theta v_\theta^l \le \Lambda_k^P.$$

Additionally, to ensure that exactly one option is selected as the number of assigned crews to each link, constraint (B9) can be incorporated into the model:

$$\text{Min } \vartheta_{L_k^P} \tag{B6}$$

$$\text{s.t. } \vartheta_{L_k^P} \ge \frac{\sigma_l}{1v_1^l + 2v_1^l + \ldots + C_1 v_{C_1}^l} \quad \forall\, l \in \acute{L}_k^P \tag{B7}$$

$$\sum_{l \in \acute{L}_k^P} \sum_{\theta \in \Phi_l} \theta v_\theta^l \le \Lambda_k^P \tag{B8}$$

$$\sum_{\theta \in \Phi_l} v_\theta^l = 1 \quad \forall\, l \in \acute{L}_k^P \tag{B9}$$

$$v_\theta^l \in \{0, 1\} \quad \forall\, l \in \acute{L}_k^P \text{ and } \forall\, \theta \in \Phi_l \tag{B10}$$

Constraint (B7) can be redefined as $$\left[1\left(\vartheta_{L'k} \times v_1^l\right) + 2\left(\vartheta_{L'k} \times v_2^l\right) + \ldots + C_l\left(\vartheta_{L'k} \times v_{C_1}^l\right)\right] \ge \sigma_l, \text{ and } \vartheta_{L'k} \times v_\theta^l$$

can be replaced with $$\acute{v}_\theta^l.$$

Because $\vartheta_{L'k}$ is continuous and $$v_\theta^l$$

is binary, $$\acute{v}_\theta^l$$

must be either 0 or $\vartheta_{L'k}$. To enforce this condition, three additional constraints, (B13)-(B15), can be introduced to the model. The resulting linearized model is as follows.

$$\text{Min } \vartheta_{L_k^P} \tag{B11}$$

$$\text{S.T. } 1 \cdot \acute{v}_1^l + 2 \cdot \acute{v}_2^l + \ldots + C_l \cdot \acute{v}_{C_1}^l \ge \sigma_l \quad \forall\, l \in \acute{L}_k^P \tag{B12}$$

$$\acute{v}_\theta^l \le M \cdot v_\theta^l \quad \forall\, l \in \acute{L}_k^P \text{ and } \forall\, \theta \in \Phi_l \tag{B13}$$

$$\acute{v}_\theta^l \le \theta_{L'k} + M\left(1 - v_\theta^l\right) \quad \forall\, l \in \acute{L}_k^P \text{ and } \forall\, \theta \in \Phi_l \tag{B14}$$

$$\acute{v}_\theta^l \le \theta_{L'k} + M\left(1 - v_\theta^l\right) \quad \forall\, l \in \acute{L}_k^P \text{ and } \forall\, \theta \in \Phi_l \tag{B15}$$

$$\sum_{\theta \in \Phi_l} v_\theta^l = 1 \quad \forall\, l \in \acute{L}_k^P \tag{B16}$$

$$\sum_{l \in \acute{L}_k^P} \sum_{\theta \in \Phi_l} \theta\, v_\theta^l \le \Lambda_k^P \tag{B17}$$

$$v_\theta^l \in \{0, 1\} \text{ and } \acute{v}_\theta^l \ge 0 \quad \forall\, l \in \acute{L}_k^P \text{ and } \forall\, \theta \in \Phi_l \tag{B18}$$

Figure 3:
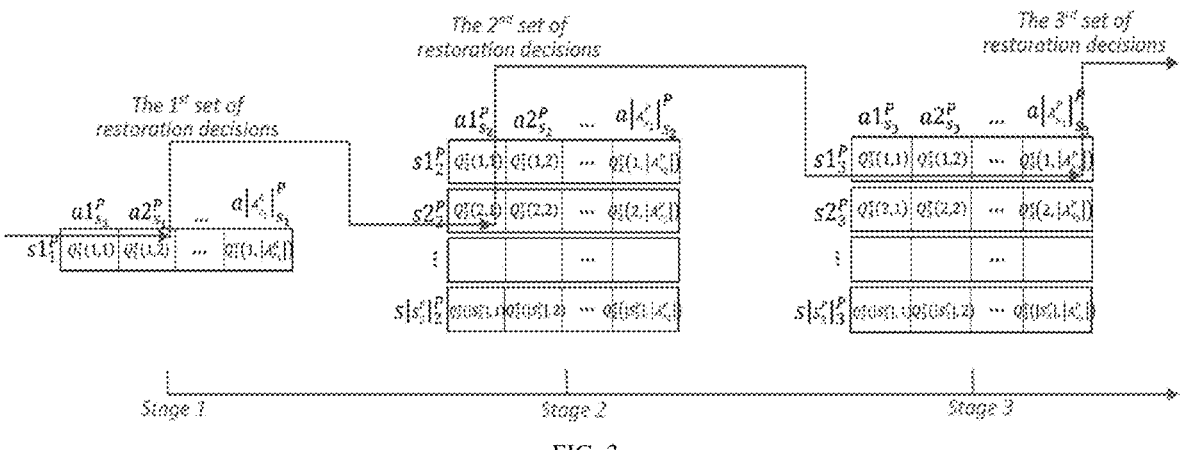
FIG. 3 shows a Markov decision process (MDP) for an agent of a power RL, according to an embodiment of the subject invention.

With respect to restoration scheduling decisions, the process of modeling $$\acute{L}_k^P$$

selection in each stage of the power MDP will now be explained. As depicted in FIG. 3, the MDP models all the potential statuses that may happen for the power network at the beginning of each stage, along with all potential decisions that can be made in each state as a decision matrix in each stage (rows of the matrix represents potential statuses and columns correspond to potential decisions).

Each decision-making stage within the power MDP is characterized by the initial condition of the power network, denoted by a set of potential states:

$$S_k^P = \{s_k^P\}.$$

Each state corresponds to a set of disrupted links that remain unrecovered up to that stage. In the first stage ($k^P=1$), there exists a single state encompassing all links in $\acute{L}^P$ available for restoration (see Stage 1 in FIG. 3). The decision space in state $$s_k^P,$$

denoted by $$A_{s_k}^P = \{a_{s_k}^P\},$$

encompasses all feasible subsets of links that can be selected for restoration at that state. Decision $$a_{s_k}^P$$

is feasible if solving model (1-4) yields a finite minimum recovery time $$\vartheta_{L_k^P = a_{s_k}^P}^*$$

and the optimal team allocation scheme $$\{w_l^{P*}\}_{L_k^P = a_{s_k}^P}$$

for the selected links in that decision. In the initial stage $(k^P=1)$, the decision space includes a maximum of $2^{|\dot{L}^P|}$ decisions. However, depending on the availability of recovery teams $$(\Lambda_k^P),$$

some decisions may become infeasible. If it is assumed that decision $$a_{s_1}^P = \dot{L}_1^P$$

is selected in stage 1 for restoration, the pool of available links for restoration in stage 2 diminishes to $$\dot{L}^P - \dot{L}_1^P,$$

consequently reducing the maximum size of the decision space to $$2^{\left|\dot{L}^P - \dot{L}_1^P\right|}.$$

The same procedure is repeated for every successive stage in the MDP.

The reward of selecting decision $$a_{s_k}^P$$

in state $s_k$ is calculated based on the total increase that making this decision (recovering the selected links) will make in fulfilling power demand of the community from the moment that the restoration for decision $$a_{s_k}^P$$

ends up to T. This reward will be calculated in the learning environment of the power RL.

Assume that decision $$a_{s_k}^P$$

is selected at the decision-making moment of $t^k$, and the total time needed to restore the links of this decision is $$\vartheta^*_{L_k^P = a_{s_k}^P},$$

calculated by model (1-4). The reward of making this decision, $$\theta_k^P(a_{s_k}^P),$$

would be equal to the total power demand that can be fulfilled by the power CI in $$\left[t^k + \vartheta^*_{a_{s_k}^P}, T\right]$$

interval in the presence of links of set $$a_{s_k}^P$$

minus the total power demand that can be fulfilled by the power CI in $$\left[t^k + \vartheta^*_{a_{s_k}^P}, T\right]$$

interval in the absence of links of set $$a_{s_k}^P.$$

The demand that can be fulfilled by the power CI with a given set of active links in each time unit (e.g., a day) is calculated using model (5-13). This model optimizes the power distribution in the power CI, $G^P(N^P, L^P)$, under different link availability scenarios. To include link availability scenarios, a binary parameter $$(\beta_l^P)$$

can be assigned to each link in the power network. Parameter $$\beta_l^P = 1$$

if directed link $l=\overrightarrow{(\acute{n},n)} \in L^P$ is active and can be employed for transferring power in the power network, and 0 otherwise.

$$\text{Minimize } Z^P = \sum\nolimits_{n \in N_D^P} UD_n^P \tag{5}$$

$$\text{Subject to: } \sum\nolimits_{\acute{n} \in N^P} x^P_{l=\overrightarrow{(n,\acute{n})}} \le PC_n^P \ \left(\forall \, n \in N_S^P\right) \tag{6}$$

$$\sum\nolimits_{\acute{n} \in N^P} x^P_{l=\overrightarrow{(\acute{n},n)}} = \sum\nolimits_{n^\wedge \in N^P} x^P_{l=\overrightarrow{(n,n')}} \ \left(\forall \, n \in N_I^P\right) \tag{7}$$

$$\sum\nolimits_{\acute{n} \in N^P} x^P_{l=\overrightarrow{(\acute{n},n)}} = DD_n^P - UD_n^P \ \left(\forall \, n \in N_D^P\right) \tag{8}$$

$$x^P_{l=\overrightarrow{(\acute{n},n)}} \le TC^P_{l=\overrightarrow{(\acute{n},n)}} \cdot \beta^P_{l=\overrightarrow{(\acute{n},n)}} \cdot y^P_{l=\overrightarrow{(\acute{n},n)}} \ \left(\forall \, l \in L^P\right) \tag{9}$$

21

-continued $$y^P_{l=(\tilde{n},n)} + y^P_{l=(n,\tilde{n})} \le 1 \quad (\forall\, l \in L^P) \tag{10}$$

$$b^P_l \cdot x^P_{l=(\tilde{n},n)} \le (\varphi_{\tilde{n}} - \varphi_n) + M\left(1 - y^P_{l=(\tilde{n},n)}\right) \quad (\forall\, l \in L^P) \tag{11}$$

$$b^P_l \cdot x^P_{l=(\tilde{n},n)} \ge (\varphi_{\tilde{n}} - \varphi_n) - M\left(1 - y^P_{l=(\tilde{n},n)}\right) \quad (\forall\, l \in L^P) \tag{12}$$

$$x^P_l, b^P_l, \varphi_n \ge 0 \quad (\forall\, n \in N^P)(\forall\, l \in L^P) \tag{13}$$

Objective function (5) minimizes the total unfulfilled demand at the demand nodes of the power CI during a day. Variable $$UD^P_n$$

measures the daily demand that cannot be fulfilled at node $$n \in N^P_D$$

under the link availability scenario of $$\{\beta^P_l \mid \forall\, l \in L^P\}.$$

Based on constraint (6), the total power flow originating from a supply node cannot violate its generation capacity $$(PC^P_n).$$

At intermediary nodes, the sum of power inflow must equal the sum of power outflow (constraint (7)). At each demand node, the total power inflow is equal to the fulfilled portion of the demand at that node (constraint (8)). Constraint (9) ensures that the power flows only through the links available in that scenario and in the movement direction identified by variable $$y^P_{l=(\tilde{n},n)}.$$

Variable $$y^P_{l=(\tilde{n},n)}$$

is 1 if the movement direction of power is from node ń toward node n, and 0 otherwise. Through each link, the power flow is only possible in one direction (constraint (10)). Constraints (11) and (12) are related to physics of the power network. A linear direct current (DC) model can be used to approximate a nonlinear alternating current (AC) model for the power network. The power flow through each link should be consistent with the reactance of that link $$(b^P_l)$$

22 and the phase angle of its connecting nodes ($\varphi_n$ and $\varphi_{\tilde{n}}$) (see also Nurre et al., Restoring infrastructure systems: An integrated network design and scheduling (INDS) problem, European Journal of Operational Research, 223(3), 794-806, 2012; which is hereby incorporated herein in its entirety). Model (5-13) optimizes the power distribution in the power network under the link availability scenario of $$\{\beta^P_l \mid \forall\, l \in L^P\}.$$

This model constitutes the learning environment of the power RL and provides reward $$\theta^P_k$$

for the restoration decisions made by the agent of the power RL.

The "Q" values in the power MDP of FIG. 3 represent the best counter cumulative rewards achievable by making each decision in each state of the decision matrices. RL is used to estimate these values for the power MDP. The process of estimating Q values by RL will now be explained. In each iteration of RL, the first restoration decision is made at time 0 ($k^P=1$), and a subset of disrupted links, $$a^P_{s_{k=1}} = L'^P_{k=1},$$

is selected for recovery using ε-greedy approach (see also Jasmin et al., Reinforcement learning approaches to economic dispatch problem, International Journal of Electrical Power & Energy Systems, 33(4), 836-845, 2011; which is hereby incorporated herein by reference in its entirety). The restoration process of these links will end at time $$\vartheta^*_{a^P_{s_{k=1}} = L'^P_{k=1}},$$

if average recovery times are materialized for the links of set $$L'^P_{k=1}.$$

To consider uncertainty in the recovery times, random values from the variation ranges of $[\check{\sigma}_l, \hat{\sigma}_l]$ will be assigned to each link, denoted as $\tilde{\sigma}_l$. These random values are used to calculate the actual time it may take to restore the selected links $$\left(\vartheta'_{a^P_{s_{k=1}} = L'^P_{k=1}}\right):$$

$$\vartheta'^P_{L'_{k=1}} = \underset{\forall l \in L'^P_{k=1}}{MAX}\left\{\frac{\sigma_l}{w^{P*}_l}\right\} \tag{14}$$

where $$w_l^{P*}$$

values are calculated by model (1-4). Selecting disrupted links of $$a_{s_{k=1}}^P = \acute{L}_{k=1}^P$$

for recovery win mane some improvement in the daily demand that can be fulfilled by the power CI. This improvement, $$\theta_{k=1}^P \left( a_{s_{k=1}}^P = \acute{L}_{k=1}^P \right),$$

is calculated using model (5-13) in the RL's learning environment as follows:

$$\theta_{k=1}^P \left( a_{s_{k=1}}^P \right) = \tag{15}$$

$$Z^{P*} \left( \beta_l^P = 0 \left( \forall\, l \in \acute{L}^P - \acute{L}_{k=1}^P \right), \beta_l^P = 1 \left( \forall\, l \in L^P - \acute{L}^P + \acute{L}_{k=1}^P \right) \right).$$

$$\left( T - \acute{\vartheta}_{\acute{L}_{k=1}}^{,P} \right) -$$

$$Z^{P*} \left( \beta_l^P = 0 \left( \forall\, l \in \acute{L}^P \right), \beta_l^P = 1 \left( \forall\, l \in L^P - \acute{L}^P \right) \right) \cdot \left( T - \acute{\vartheta}_{\acute{L}_{k=1}}^{,P} \right)$$

This reward will be used to update the Q estimation of cell $$\left( s_{k=1}^P, a_{s_{k=1}}^P \right)$$

in the power MDP using the Bellman's equation (see also Sutton and Barto, Reinforcement learning, Journal of Cognitive Neuroscience, 11(1), 126-134, 1999; which is hereby incorporated herein by reference in its entirety).

$$Q^{\tau+1} \left( s_{k=1}^P, a_{s_{k=1}}^P \right) = \tag{16}$$

$$(1 - \xi) Q^{\tau} \left( s_{k=1}^P, a_{s_{k=1}}^P \right) + \xi \left[ \theta_{k=1}^P \left( a_{s_{k=1}}^P \right) + \gamma \max_{a_{s_{k=2}}^P} Q^{\tau} \left( s_{k+1=2}^P, a_{s_{k+1=2}}^P \right) \right]$$

where $\xi$ and $\gamma$ respectively control the convergence speed of the RL learning process and the weight of future rewards. Then, the second restoration decision is made in the second stage ($k^P = 2$) by selecting another subset of disrupted links, $$\acute{L}_{k=2}^P,$$

that have not been recovered by time $$\acute{\vartheta}_{\acute{L}_{k=1}}^{,P} .$$

The reward of making this decision and the Q estimation of the selected cell are calculated using the same approach. The RL agent continues this decision-making process until all disrupted links are restored.

Using the ε-greedy approach, different actions are selected for MDP stages in the iterations of the RL, and Q values are updated continuously. After a high number of RL iterations, the Q values of the power MDP, estimated by equation (16), converge to their actual values. After convergence, we derive the optimal link restoration policy for the power CI ($\pi^P*$: $S^P \rightarrow A^P$) as follows:

$$\pi^{P*} = \underset{\pi^{P*}}{\text{Argmax}} \left( \sum_{k^P=1}^{|K^P|} \gamma^{k^P} \cdot \theta_k^P \right) \tag{17}$$

This policy recommends the best restoration schedule and resource allocation for the disrupted links of the power CI with stochastic recovery times. However, the interdependencies of these decisions to the restoration decisions of the road CI are completely ignored in this policy. Therefore, some restoration decisions of the recommended policy may not be executable in practice.

Similar to the power RL, the problem of identifying the best restoration schedule and team allocation for the disrupted links in the road network is formulated as an MDP. Assuming that $\acute{L}^R$ is the set of disrupted links in the road network, at each decision-making stage of the road MDP ($\forall k^R \in K^R$), the agent of the road RL selects a subset of disrupted links for restoration $$\left( \acute{L}_k^R \subset \acute{L}^R \right)$$

and allocates recovery teams $$\left( \Lambda_k^R \right)$$

to those links $$\left( w_l^R, l \in \acute{L}_k^R \right).$$

The method used for team allocation is similar to the power RL. Model (1-4) is used to determine the best pattern of assigning recovery teams to the links selected for simultaneous restoration in $$\acute{L}_k^R, \{ w_l^{R*} \}_{\acute{L}_k^R}.$$

The decision-making procedure used by the agent of the road RL for restoration schedule is the same as the power RL. At each stage of the road MDP, the initial circumstance of the road network is represented by a set of potential states:

$$S_k^R = \{ s_k^R \}.$$

Each state corresponds to a set of disrupted links that have not been recovered up to that stage. In state $$s_k^R,$$

the decision space, denoted as $$A_{s_k}^R = \{a_{s_k}^R\},$$

encompasses all feasible subsets of links eligible for restoration. The reward associated with selecting decision $$a_{s_k}^R$$

in state $s_k$ is determined by quantifying the overall reduction in post-disaster travel time/cost resulting from making decision $$a_{s_k}^R$$

(i.e., restoring the chosen roads of this decision). This reduction will be calculated from the moment that the restoration operation ends for decision $$a_{s_k}^R$$

up to T. This reward will be calculated in the learning environment of the road RL, which will be elaborated in the following three paragraphs.

In the case where decision $$a_{s_k}^R$$

is selected at the decision-making moment $t^k$, the time needed to accomplish this restoration operation is $$\acute{\vartheta}_{a_{s_k}^R}.$$

This means the links of decision $$a_{s_k}^R$$

will be available for use at time $$t^k + \acute{\vartheta}_{a_{s_k}^R}.$$

So, the reward of making this decision, $$\theta_k^R(a_{s_k}^R),$$

would be equal to the total travel time/cost in the road CI in $$\left[t^k + \acute{\vartheta}_{a_{s_k}^R}, T\right]$$

interval in the absence of the links of set $$a_{s_k}^P$$

minus the total travel time/cost in the road CI in $$\left[t^k + \acute{\vartheta}_{a_{s_k}^R}, T\right]$$

interval in the presence of links of set $$a_{s_k}^P.$$

The post-disaster travel time/cost in the road CI in each time unit (e.g., each day) is calculated using model (18-23). This model optimizes the traffic routing over the road CI, $G^R(N^R, L^R)$, under different link availability scenarios. The availability of links in the network is determined by a binary parameter $$\beta_l^R.$$

Parameter $$\beta_l^R = 1$$

if link $l=(n, \acute{n})$ is active and available for traveler usage, and $$\beta_l^R = 0$$

otherwise.

$$\text{Minimize } Z^R = \sum\nolimits_{\forall od \in OD} \sum\nolimits_{\forall l \in L^R} x_{l=(n,\acute{n})}^{R,od} \cdot tt_{l=(n,\acute{n})} \tag{18}$$

$$\text{Subject to: } \sum\nolimits_{\forall od \in OD} x_{l=(n,n)}^{R,od} \le FC_{l=(n,n)}^R \cdot \beta_{l=(n,n)}^R \quad (\forall\, l \in L^R) \tag{19}$$

$$\sum\nolimits_{\forall n \in N^R} x_{l=(m,n)}^{R,od} = TF_{od}^R \quad (\forall\, od = (m, \acute{m}) \in OD) \tag{20}$$

$$\sum\nolimits_{\forall n \in N^R} x_{l=(n,\acute{m})}^{R,od} = TF_{od}^R \quad (\forall\, od = (m, \acute{m}) \in OD) \tag{21}$$

$$\sum\nolimits_{\forall n \in N^R} x_{l=(n,n)}^{R,od}\big|_{n \ne m, \acute{m}} = \sum\nolimits_{\forall n^* \in N^R} x_{l=(n,n^*)}^{R,od}\big|_{n \ne m, \acute{m}} \quad (\forall\, od = (m, \acute{m}) \in OD) \tag{22}$$

$$x_l^{R,od} \ge 0 \quad (\forall\, l \in L^R) \text{ and } (\forall\, od \in OD) \tag{23}$$

Objective function (18) minimizes the total post-disaster travel time/cost in the road network. Parameter $tt_l$ represents the travel time/cost for a traveler moving through link $l \in L^R$. According to constraint (19), traffic can only flow through active links (when $$\beta_l^R = 1),$$

and the flow volume cannot exceed the capacity of the link $$(FC_l^R).$$

Constraint (20) ensures that the total traffic outflow from the origin node of each OD pair is equal to the traffic demand of that OD. Similarly, the total traffic inflow to the destination node of each OD is equal to the OD's traffic demand (constraint (21)). At intermediary nodes, which are neither the origin nor the destination of an OD pair, the sum of inflow must equal the sum of outflow, as expressed by constraint (22).

Model (18-23) determines the best post-disaster traffic pattern in the road CI with the minimum travel cost/time under the link availability scenario of $$\{\beta_l^R \mid \forall \, l \in L^R\}.$$

As the learning environment of the road RL, this model provides rewards for the restoration decisions made by the agent of the road RL at each stage of its MDP.

The RL mechanism, similar to the power CI, is used to estimate "Q" values for decision matrices of the road MDP. In each iteration of RL, the first restoration decision ($k^R = 1$) happens at time 0, and a subset of disrupted links, $$a_{s_{k=1}}^R = \acute{L}_{k=1}^R,$$

is selected for recovery using $\varepsilon$-greedy approach. The restoration process of these links will end at time $$\acute{\vartheta}_{\acute{L}_{k=1}^R}^{,R} \, .$$

This decision will make some improvement in daily traffic time/cost throughout the road CI, which will be calculated using model (18-23) in the RL's learning environment as follows.

$$\theta_{k=1}^R(a_{s_{k=1}}^R) =$$

$$Z^{R*}\left(\beta_l^R = 0(\forall \, l \in \acute{L}^R), \beta_l^R = 1(\forall \, l \in L^R - \acute{L}^R)\right) \cdot \left(T - \acute{\vartheta}_{\acute{L}_{k=1}^R}^{,R}\right) - Z^{R*}$$

$$\left(\beta_l^R = 0(\forall \, l \in \acute{L}^R - \acute{L}_{k=1}^R), \beta_l^R = 1(\forall \, l \in L^R - \acute{L}^R + \acute{L}_{k=1}^R)\right) \cdot \left(T - \acute{\vartheta}_{\acute{L}_{k=1}^R}^{,R}\right)$$

Equation (24) calculates the total reduction in travel time/cost during T if links of set $$a_{s_{k=1}}^R = \acute{L}_{k=1}^R$$

are restored at $k^R = 1$. This reward is used to update the Q estimation of cell $$(s_{k=1}^R, a_{s_{k=1}}^R)$$

in the road MDP as follows.

$$Q^{\tau+1}(s_{k=1}^R, a_{s_{k=1}}^R) = \tag{25}$$

$$(1 - \xi)Q^\tau(s_{k=1}^R, a_{s_{k=1}}^R) + \xi\left[\theta_{k=1}^R(a_{s_{k=1}}^R) + \gamma \max_{a_{s_{k=2}}^R} Q^\tau(s_{k+1=2}^R, a_{s_{k+1=2}}^R)\right]$$

The similar procedure is repeated to update Q values for other stages of the MDP. After a high number of RL iterations ($\tau$), the Q values of the road MDP converge to their actual values. After convergence, the optimal link restoration policy is derived for the road CI ($\pi^{R*}: S^R \rightarrow A^R$) as follows.

$$\pi^{R*} = \underset{\pi^{R*}}{\operatorname{Argmax}}\left(\sum_{k^R=1}^{|K^R|} \gamma^{k^R} \cdot \theta_k^R\right) \tag{26}$$

This policy determines the best uncoordinated restoration schedule and resource allocation for the disrupted links of the road CI.

Without further elements, there would be no communication and information sharing between the agents of the power and road RLs. This lack of coordination would result in overlooking procedural interdependencies (represented by sets $$\Pi_l^P (\forall \, l \in L^P)$$

and $$\Pi_l^R (\forall \, l \in L^R))$$

in the policy generation procedure of the RLs. Therefore, the uncoordinated policies generated by distinct RLs may be infeasible or suboptimal. Infeasibility means the recommended policy for a CI cannot be executed in practice as is because the prerequisites of the links selected for restoration in each decision-making stage may not have been necessarily restored in the interdependent CI. To facilitate communication between the agents of RLs, the "coordinator" can be designed, implemented, and/or used, and the coordinator can couple the agents in the coupled RL mechanism, preventing or inhibiting them from making infeasible restoration decisions, and coordinating their decisions. The coordinator includes two modules (see also FIG. 4). The coordinator can have an FM and a PM. After accomplishing each restoration decision in each RL, the information of the recovered links and their availability times can be stored in the FM module. This information can be available for the agents of other RLs and can prevent or inhibit them making infeasible restoration decisions. The PM can share the best available estimation of the maximum Q value that is achievable in each state of each MDP stage with agents of other RLs. This information helps those agents predict the consequences of their decisions in each stage on interdependent CIs and select decisions that result in better aggregated rewards (summation of rewards achieved by the agent and the agents of its interdependent CIs) rather than individual rewards.

Figure 4:
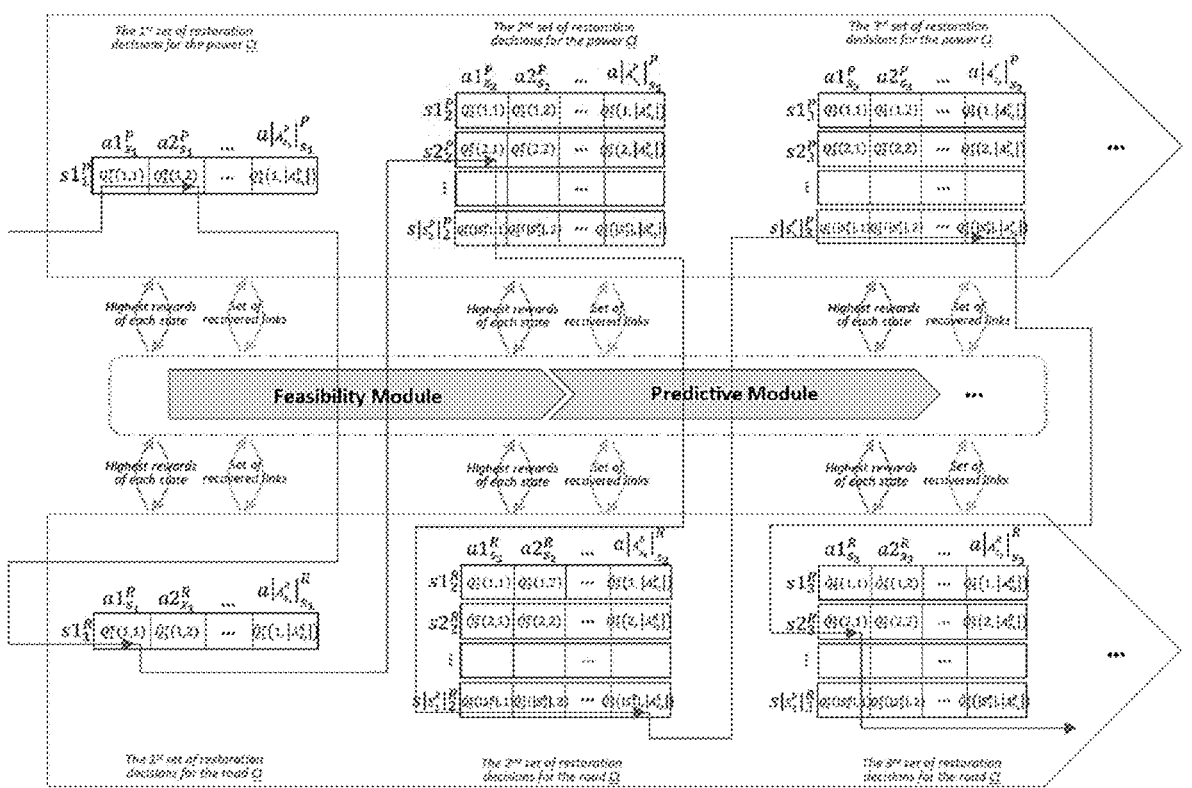
FIG. 4 shows a decision-making structure of coupled RL, according to an embodiment of the subject invention.

FIG. 4 shows how the decision-making structure of the agents should be modified in the coupled RL mechanism. There is no change in the RLs' learning environments. The steps of the decision-making procedure for the agents of the coupled RLs mechanism can include Information sharing through FM, feasibility checking through FM, and/or consequence predicting through PM.

With respect to information sharing through FM, after making a restoration decision in each stage of an RL, the information of the recovered links and their recovery accomplishment times are recorded in the FM module of the "coordinator". In the understudy problem of concurrent restoration planning for power and road CIs, there are two RLs. Therefore, the FM module will include two sets.

$$\Lambda_k^P = \{(l^P, ct_l^P)\} \text{ and } \Lambda_k^R = \{(l^R, ct_l^R)\} \tag{27}$$

Set $$\Lambda_k^P$$

includes all the mins what have been restored in the power CI up to the stage $k^P$ and their recovery accomplishment times $$(ct_l^P).$$

The same information is recorded in set $$\Lambda_k^R$$

for the road CI. Also, a record should be kept of the decision-making moments throughout the stages of the MDPs.

$$\psi_k^P = \tag{28}$$

$$\psi_{k-1}^P + \overset{'}{\partial}_{l_{k-1}^P} \quad (1 < k^P \le |K^P|) \text{ and } \psi_k^R = \psi_{k-1}^P + \overset{'}{\partial}_{l_{k-1}^P} \quad (1 < k^R \le |K^R|)$$

$$\psi_k^P$$

represents the time at which the restoration decisions are made at stage k of the power MDP.

$$\psi_k^R$$

demonstrates the same time for the road MDP $$(\psi_1^P = \psi_1^P = 0).$$

With respect to feasibility checking through FM, before making any decision in each stage of an MDP, the feasibility of these decisions will be checked with the sets of the FM. For example, the decision $$a_{s_k}^P$$

is feasible in stage $k^P$ of the power MDP if all of its prerequisites in set $$\bigcup\nolimits_{l \in a_{s_k}^P} \Pi_l^P$$

exist in set $$\Lambda_k^R,$$

and their recovery accomplishment times are less than or equal to $$\psi_k^P.$$

$$ct_l^R \le \psi_k^P \text{ for } \forall l \in a_{s_k}^P \tag{29}$$

The sets of feasible decisions in each stage of the power and road MDPs are represented by $$\hat{A}_{s_k}^P = \{\hat{a}_{s_k}^P\} \text{ and } \hat{A}_{s_k}^R = \{\hat{a}_{s_k}^R\}.$$

With respect to consequence predicting through PM, the PM of the coordinator helps the agent of each RL to predict the consequences of its decisions on interdependent CIs. This guides them to make coordinated, rather than distinct, restoration decisions because they will consider the impacts of their decisions not only on their own CI but also on the interdependent CIs. For this purpose, the PM records the maximum Q value that is achievable in each state of each MDP stage $$(\Omega_k^{P,\tau} \text{ and } \Omega_k^{R,\tau}).$$

These values are not fixed and updated in the iterations of RLs ($\tau$).

$$\Omega_k^{P,\tau} = \left[ MQ^{P,\tau}\!\left(s_k^P\right) = \max_{a_{s_k}^P} Q^\tau\!\left(s_k^P, a_{s_k}^P\right) \right] \text{ and} \tag{30}$$

$$\Omega_k^{R,\tau} = \left[ MQ^{R,\tau}\!\left(s_k^R\right) = \max_{a_{s_k}^R} Q^\tau\!\left(s_k^R, a_{s_k}^R\right) \right]$$

To employ these predictions in the decision-making process of agents, the Bellman's equation (equation (16)) can be revised as follow.

$$Q^{\tau+1}\!\left(s_k^P, a_{s_k}^P\right) = \tag{31}$$
$$(1-\xi)Q^\tau\!\left(s_k^P, a_{s_k}^P\right) + \xi\!\left[ \theta_k^P\!\left(a_{s_k}^P\right) + \gamma \max_{a_{s_{k+1}}^P} Q^\tau\!\left(s_{k+1}^P, a_{s_{k+1}}^P\right) + \lambda MQ^{R,\tau}\!\left(s_k^R\right) \right]$$

According to equation (31), the agent of the power RL not only considers the impact of the decisions made at stage $k^P$ on the future achievable rewards in the power CI, $$\max_{a_{s_{k+1}}^P} Q^\tau\!\left(s_{k+1}^P, a_{s_{k+1}}^P\right),$$

but also considers the sequence of these decisions on the maximum achievable reward in the road CI, $$MQ^{R,\tau}\!\left(s_k^R\right).$$

Parameter $\lambda$ represents the importance of road CI performance for the agent of the power RL. Similarly, the Q values for the road CI's agent will be calculated as follows.

$$Q^{\tau+1}\!\left(s_k^P, a_{s_k}^P\right) = \tag{32}$$
$$(1-\xi)Q^\tau\!\left(s_k^P, a_{s_k}^P\right) + \xi\!\left[ \theta_k^R\!\left(a_{s_k}^R\right) + \gamma \max_{a_{s_{k+1}}^R} Q^\tau\!\left(s_{k+1}^R, a_{s_{k+1}}^R\right) + \lambda MQ^{P,\tau}\!\left(s_k^P\right) \right]$$

In the first RL iteration, the sequence of decisions in the coupled RLs mechanism of the road and power CIs is as follows.

Using the $\varepsilon$-greedy approach and considering $$\Lambda_{k=1}^R = \emptyset$$

in the FM and $$\Omega_{k=1}^{R,\tau=1} = [\vec{0}]$$

in the PM, the agent of the power RL makes the first set of restoration decisions, $$\hat{a}_{s_{k=1}}^P,$$

for the power CI at stage $k^P=1$. After making these decisions, the information of the links selected for recovery and their restoration accomplishment times is added to set $$\Lambda_{k=2}^P$$

in the FM. After updating Q values using equation (31), set $$\Omega_{k=1}^{P,\tau=1}$$

is updated in the PM. Note that the time at the moment of making these decisions is $$\psi_1^P = 0.$$

After making these decisions, the time increases to $$\psi_2^P = \psi_1^P + \hat{\vartheta}_{\hat{a}_{s_{k=1}}^P}$$

in the power RL.

Then, using the $\varepsilon$-greedy approach and considering $$\Lambda_{k=1}^P = \emptyset$$

in the FM and $$\Omega_{k=1}^{P,\tau=1}$$

in the PM, the agent of the road RL makes the first set of restoration decisions, $$\hat{a}_{s_{k=1}}^R,$$

for the road CI at stage $k^R=1$. The information of the links selected for recovery and their restoration accomplishment times is added to set $$\Lambda_{k=2}^R$$

in the FM. After updating Q values using equation (32), set $$\Omega_{k=1}^{R,\tau=1}$$

is updated in the PM. Also, the decision-making time increases to $$\psi_2^R = \psi_1^R + \hat{\vartheta}_{\hat{a}_{s_{k=1}}^R}$$

in the road RL

Then, considering $$\Lambda_{k=2}^R$$

in the FM and $$\Omega_{k=2}^{R,\tau=1} = [\vec{0}]$$

in the PM, the agent of the power RL makes the second set of restoration decisions, $$\hat{a}_{s_{k=2}}^P,$$

for the power CI using the ε-greedy approach. The information of selected links is added to set $$\Lambda_{k=3}^P$$

in the FM, used to calculate new Q values and update set $$\Omega_{k=2}^{P,\tau=1}$$

in the PM, and employed to increase the power RL time to $$\psi_3^P = \psi_2^P + \hat{\vartheta}_{\hat{a}_{s_{k=2}}^P}.$$

This procedure continues for all stages in the coupled RLs. In the other iterations, all the calculations will be the same, but the Q values of the previous iteration will substitute the zero values of Q in the MDP matrices.

Embodiments of the subject invention provide a focused technical solution to the focused technical problem of how to coordinate restoration of interdependent CIs after a disaster. The solution is provided by using a dedicated RL module for each CI, along with a coordinator (module) to coordinate restoration policy between each interdependent CI to inhibit infeasible restoration decisions and help optimize the overall restoration policy for all CIs. Embodiments of the subject invention improve the technological field of post-disaster restoration of CIs by using RL modules and a coordinator module to help devise and optimize restoration policy. A main practical application is providing the devised restoration policy to restoration personnel to implement in order to restore the interdependent CIs after a disaster and help get the affected community or communities back to normalcy.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

When the term module is used herein, it can refer to software and/or one or more algorithms to perform the function of the module; alternatively, the term module can refer to a physical device configured to perform the function of the module (e.g., by having software and/or one or more algorithms stored thereon).

When ranges are used herein, combinations and subcombinations of ranges (including any value or subrange contained therein) are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

EXAMPLE 1

Figure 5A:
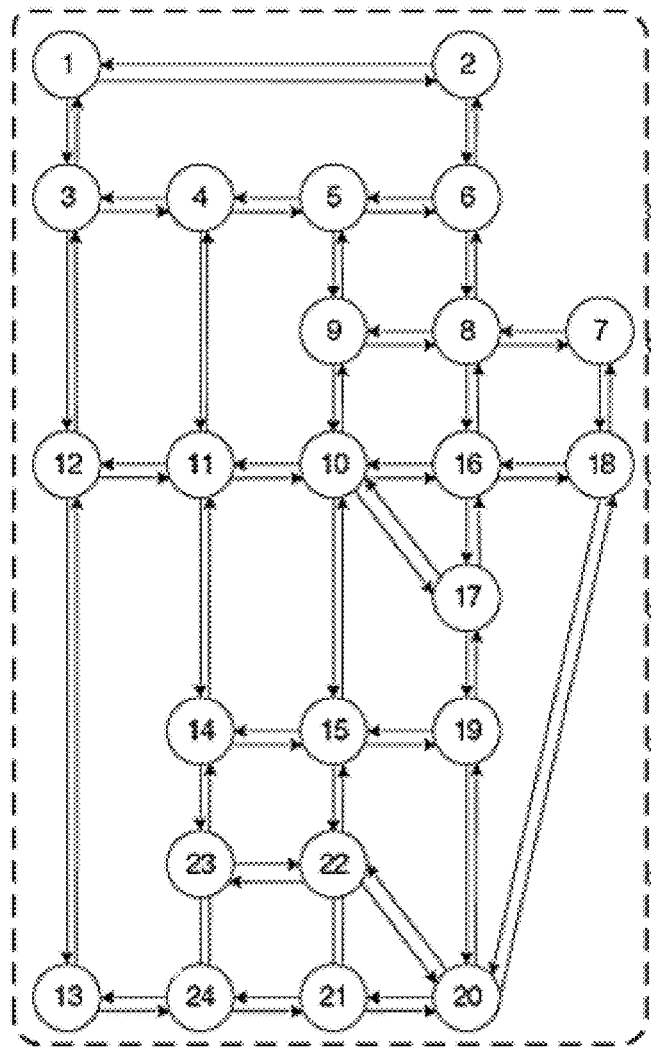
FIG. 5A shows a network of road CIs.
Figure 5B:
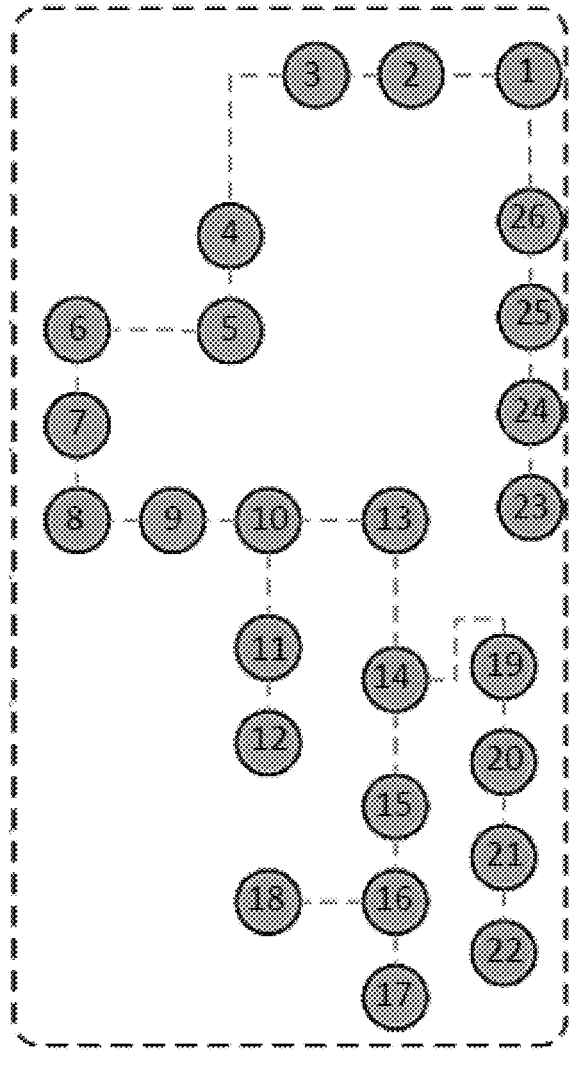
FIG. 5B shows a network of power CIs (see also He et al., Sustainability SI: Optimal prices of electricity at public charging stations for plug-in electric vehicles, Networks and Spatial Economics, 16, 131-154, 2016; which is hereby incorporated herein by reference in its entirety).

Tornadoes are a prevalent natural disaster in the United States (U.S.), with an average of 1200 occurrences annually. The U.S. experiences a higher frequency of severe tornadoes, including those categorized as EF4 and EF5, compared to other regions worldwide. Particularly, these severe tornadoes are common in the central U.S., predominantly on the eastern side of the Rocky Mountains. The term "Tornado Alley" is often used to denote the most tornado-prone areas in the U.S., stretching from northern Texas to the Canadian prairies and encompassing several states such as Texas, Louisiana, Oklahoma, Kansas, Nebraska, Iowa, and South Dakota. To evaluate the performance of the embodiment for restoration for road and power CIs discussed above and depicted in FIGS. 1C, 3, and 4, Sioux Falls, South Dakota was chosen as a study region. The road and power CIs of the study region are represented in FIGS. 5A and 5B, respectively. For performance evaluation, several tornado scenarios were generated for the study region that concurrently cause some disruptions in the power and road CIs.

Tornado forecasts and warnings in the U.S. are exclusively issued by the National Weather Service, operating under the National Oceanic and Atmospheric Administration (NOAA). According to NOAA reports, tornadoes exhibit variable movement patterns, although their predominant trajectories are typically from southwest to northeast and from west to east. Most tornadoes have durations of less than 10 minutes. Utilizing data on tornado path lengths since 1950, the average distance covered by tornadoes is approximately 3.5 miles. This information serves as the basis for generating realistic tornado scenarios. For scenario generation, four primary movement directions were considered (southwest→northeast, west→east, southeast→northwest, and east→west) for the tornado. Additionally, three options were considered for each of tornado path length (2.5, 3.5, and 4.5 miles) and tornado severity (low, medium, and high). Within the tornado's path, a varying percentage (30%, 60%, and 90%) of links within CIs were disrupted at different severity levels. The recovery time for each disrupted link is proportional to its length and was considered as a random variable with a uniform distribution within a specified variation range. Each scenario was evaluated under three different numbers of recovery teams (three crews, six crews, and nine crews) to assess the performance of the embodiment of the subject invention across varying levels of resource availability.

Figure 10:
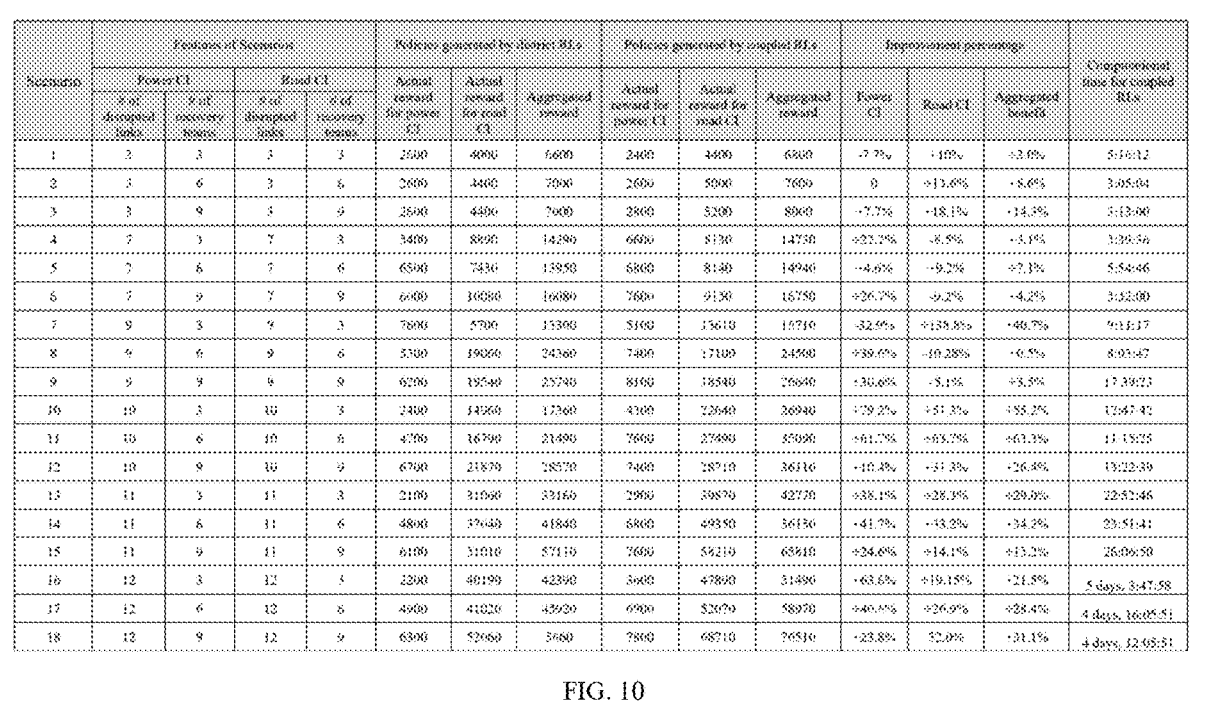

The results of solving the generated scenarios are summarized in the tables in FIGS. 9 and 10. Each scenario was solved by two different approaches: (1) solved by distinct RLs to generate uncoordinated restoration policies for the power and road CIs, where interdependencies between the CIs are ignored; and solved using the coupled RL mechanism (with a coordinator) to generate coordinated restoration policies for the power and road CIs, considering interdependencies between the CIs.

Figure 6A:
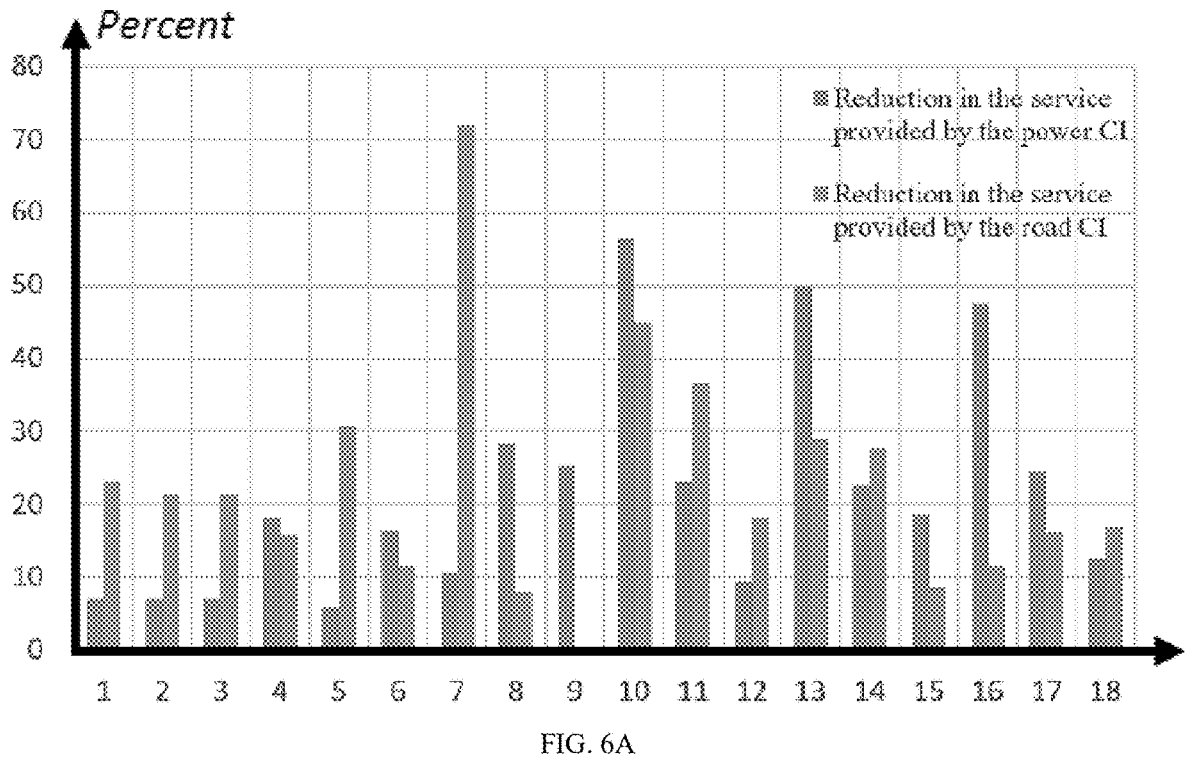
FIG. 6A shows a bar chart of percent reduction in service provided by power and road CIs for different scenarios. For each scenario, the left bar is for reduction in the service provided by the power CI and the right bar is for reduction in the service provided by the road CI.
Figure 6B:
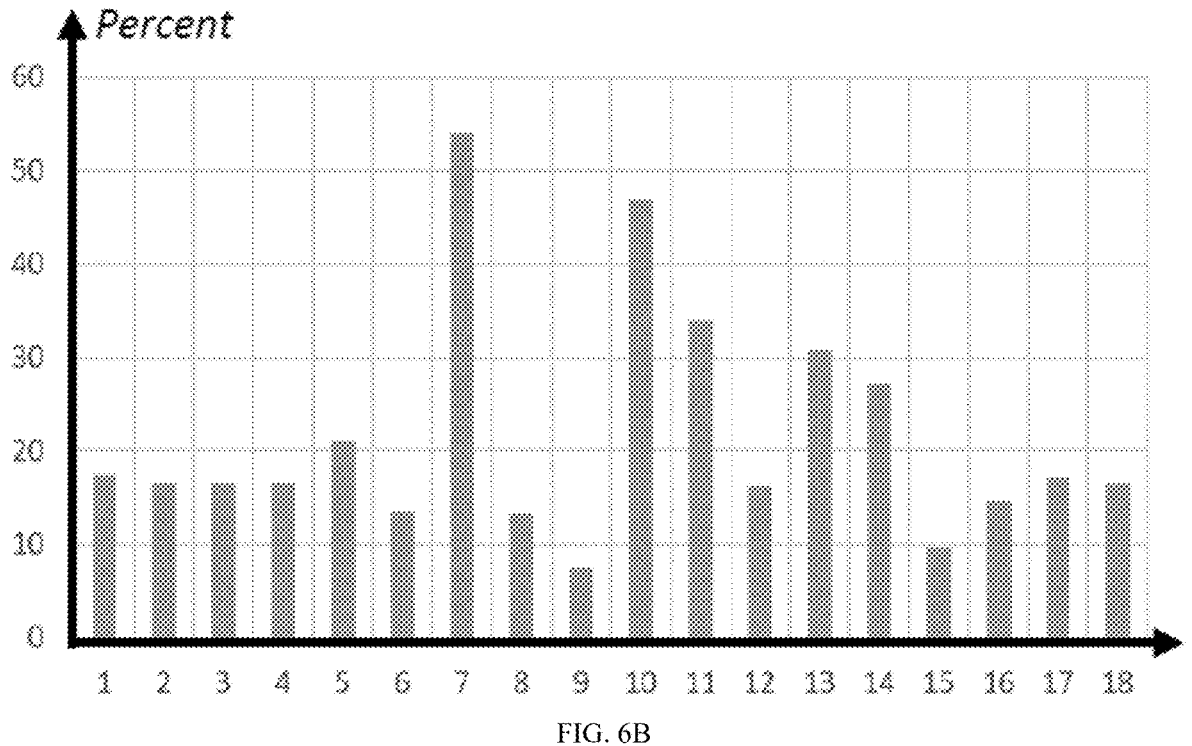
FIG. 6B shows a bar chart of percent reduction in aggregated service provided by both power and road CIs for different scenarios.

The policies generated by distinct RLs are not executable in practice as they are, due to the neglect of CI interdependencies during policy generation. Consequently, the actual rewards they yield (measured by the improvement in the service they provide to the community) differ from the nominal rewards predicted by RLs. To calculate their real reward, the execution of these policies was revised to account for CI interdependencies. For instance, the execution of a selected link in a policy of a CI is delayed until all perquisites links within other interdependent CIs are restored. Subsequently, the actual rewards of the uncoordinated restoration policies on the service provision capabilities of their corresponding CIs (e.g., an increase in demand fulfillment capability for the power CI and a reduction in the travel time/cost for travelers in the road CI) were recalculated based on their execution possibilities. These actual rewards and their nominal values are summarized in columns 9-11 and columns 6-8, respectively, of the table in FIG. 9. A comparison of actual and nominal rewards highlights the implementation bias resulting from uncoordinated decision-making in the restoration process of interdependent CIs, as outlined in columns 12-14 of the table in FIG. 9, and visualized in FIGS. 6A and 6B.

Comparison of actual and nominal rewards for the power CI in different disaster scenarios reveals that the actual additional service provided (e.g., the extra power demand fulfilled) when implementing uncoordinated restoration policies from distinct RL was 5.8% to 56.4% lower than their nominal predicted values. This reduction in the service provision capability of the power CI is named the implementation bias of uncoordinated restoration policy for the power CI. The average implementation bias for scenarios with three recovery teams was 31.6%. This average bias reduces to 18.6% and 15.0% for scenarios with six and nine teams, respectively.

Similarly, the comparison for the road CI in various disaster scenarios indicates that the actual extra service provided (e.g., the reduction in the total traffic time/cost of the road network) when implementing uncoordinated restoration policies can be up to 72.0% less than their nominal predicted values. The average implementation bias for scenarios with three, six, and nine recovery teams was 32.7%, 23.5%, and 12.8%, respectively.

Finally, when comparing the actual aggregated reward of the power and road CIs (representing the total service provided by the CIs to the community) with the nominal aggregated expected service, the implementation bias for both CIs varied within the [7.5%, 53.9%] range. The same trend persisted when increasing the number of recovery teams involved in the restoration process of CIs. The average implementation bias for scenarios with three, six, and nine recovery teams was 30.1%, 21.6%, and 13.4%, respectively. These findings underscore the significance of coordinated restoration for interdependent CIs, particularly when recovery resources are severely limited. Reducing the number of recovery teams further exacerbates the implantation bias caused by uncoordinated restoration policies.

In the table in FIG. 10, column 6 illustrates the additional power demand that can be met by the power CI over the T horizon when implementing the uncoordinated restoration policy generated by the distinct RL. Column 7 displays the reduction in post-disaster travel time/cost for travelers in the road network over the T horizon when the restoration policy generated by the distinct RL is applied. Column 8 encompasses the aggregated rewards of implementing uncoordinated restoration policies for both power and road CIs. Columns 9, 10, and 11 provide the same information for the coordinated restoration policies generated by the couple RLs mechanism.

Figure 7:
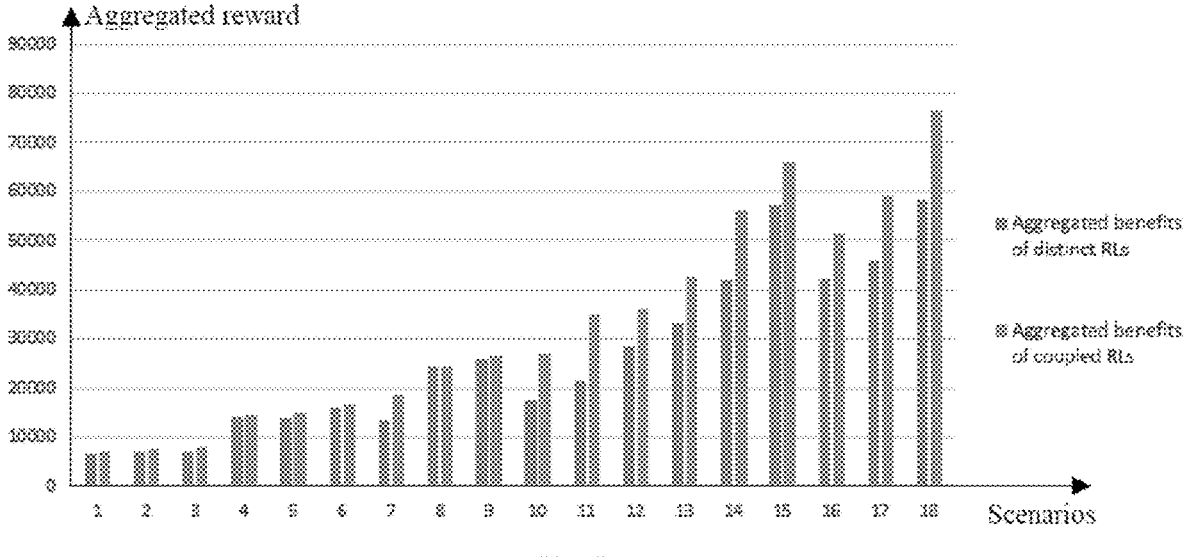
FIG. 7 shows a bar chart of a comparison of aggregated rewards generated by coordinated and uncoordinated policies. For each scenario, the left bar is for aggregated benefits of distinct RL modules and the right bar is for aggregated benefits of coupled RL modules.

The comparison of aggregated rewards resulting from uncoordinated and coordinated restoration policies reveals that policies generated by the coupled RLs mechanism consistently yielded higher aggregated rewards for interdependent CIs (refer to FIG. 7). The overperformance of the coordinated restoration policy ranges within the [0.5%, 63.3%] interval. The enhancement brought about by the coordinated policies is more significant in larger scenarios with a higher number of disrupted links. This underscores the importance of coordination in restoration operations during severe disasters that lead to broader disruptions in CIs.

An individual examination of the improvements made by coordinated restoration policies on the power and road CIs reveals that, in small disaster scenarios with a lower number of disrupted links, coupled RLs attempt to identify and propose feasible/executable restoration policies that are Pareto-optimal compared to the infeasible/un-executable restoration policies generated by distinct RLs. For example, in scenario 1, the reward caused by the coordinated policy of the coupled RLs is 7.7% lower for the power CI, but 10% higher for the road CI. In contrast, in scenario 4, the coordinated policy results in 22.2% higher reward for the power CI and an 8.5% lower reward for the road CI.

Figure 8:
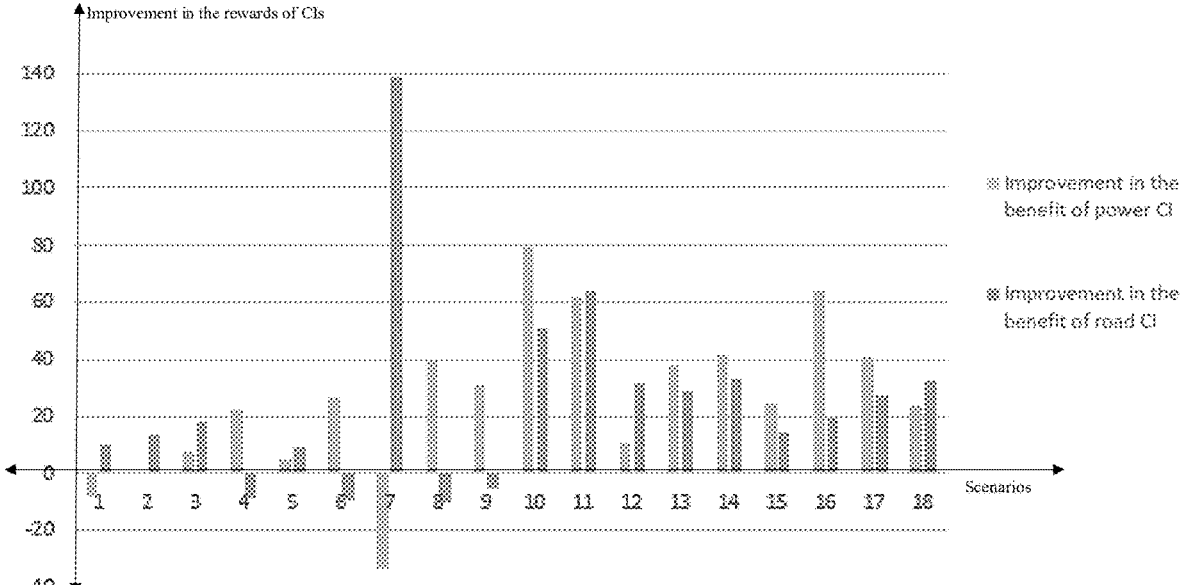
FIG. 8 shows a bar chart of improvement made by coordinated restoration policies in the rewards of interdependent CIs. For each scenario, the left bar is for improvement in the benefit of power CI and the right bar is for improvement in the benefit to road CI.

However, this trend changes in larger scenarios with a higher number of disrupted links, as illustrated in FIG. 8. In more severe disasters with increased disruptions, the coordinated restoration policies generated by coupled RLs dominate compared to the uncoordinated policies of distinct RLs. For example, in scenario 10, the rewards caused by the coordinated restoration policy are 79.2% higher for the power CI and 51.3% higher for the road CI. Similarly, in scenario 13, coordinated policies lead to 38.1% higher reward for the power CI and a 28.4% higher reward for the road CI. This demonstrates the effectiveness of the coupled RLs mechanism in generating superior policies in large-scale disasters with heightened disruption across the interdependent infrastructures of a community.

Embodiments of the subject invention provide an RL-optimization mechanism comprising a modeling technique and a solution approach for coordinated and synergistic decision-making for a set of DISs. The mechanism is able to address heterogenous operating contexts of DISs, simultaneously coordinate their decisions and preserve their privacy through limited information sharing, and handle uncertainties and dynamisms in the operating context of DISs to make robust and adaptive solutions. The mechanism was applied for designing coordinated restoration policies for interdependent road and power CIs affected by a disaster, and its performance was evaluated on road and power CIs in Sioux Falls, South Dakota, disrupted by several tornado scenarios (Example 1). The findings show that restoration policies lacking coordination and disregarding interdependencies between CIs can result in implementation biases of up to 72%. This bias amplifies in post-disaster situations with limited recovery resources. In comparison to uncoordinated policies, coordinated policies demonstrate an improvement ranging from 0.5% to 63%. The effectiveness of coordinated policies is particularly significant in larger scenarios with a greater number of disrupted links.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A system for advancing the restoration process for interdependent critical infrastructures (CIs) after a disaster, the system comprising:
    a processor; and
    a machine-readable medium in operable communication with the processor and having instructions stored thereon that, when executed by the processor, perform the following steps:
        a) receiving first data from a first CI system affected by the disaster;
        b) generating a first set of decisions regarding a first restoration policy for the first CI system using a first reinforcement learning (RL) module;

c) providing the first set of decisions to a coordinator module;
        d) receiving second data from a second CI system affected by the disaster, the second CI system having interdependency with the first CI system while being a completely different CI system than the first CI system;
        e) providing the first set of decisions from the coordinator module to a second RL module different from the first RL module;
        f) generating a second set of decisions regarding a second restoration policy for the second CI system using the second RL module, the generating of the second set of decisions taking into account the first set of decisions;
        g) providing the second set of decisions to the coordinator module;
        h) providing the second set of decisions from the coordinator module to the first RL module;
        i) generating an updated first set of decisions regarding the first restoration policy for the first CI system using the first RL module, the generating of the updated first set of decisions taking into account the second set of decisions;
        j) providing the updated first set of decisions to the coordinator module;
        k) providing the updated first set of decisions from the coordinator module to the second RL module;
        l) Generating an updated second set of decisions regarding the second restoration policy for the second CI system using the second RL module, the generating of the updated second set of decisions taking into account the updated first set of decisions;
        m) providing the updated second set of decisions to the coordinator module;
        n) providing the updated second set of decisions from the coordinator module to the first RL module;
        o) repeating steps i)-n) a predetermined amount of times, with each iteration of step i) taking into account the most recent updated second set of decisions and each iteration of step l) taking into account the most recent updated first set of decisions, resulting in a final first set of decisions for the first restoration policy for the first CI system and a final second set of decisions for the second restoration policy for the second CI system;
        p) providing to restoration personnel the final first set of decisions and the final second set of decisions, allowing the restoration personnel to implement the first restoration policy for the first CI system and the second restoration policy for the second CI system; and
        q) physically restoring the first CI system based on the first restoration policy for the first CI system, and physically restoring the second CI system based on the second restoration policy for the second CI system,
    the coordinator module being configured to facilitate information exchange between the first CI system and the second CI system, thereby enabling coordinated decision-making of the first CI system and the second CI system,
    the coordinator module being further configured to minimize information sharing between the first CI system and the second CI system while still allowing for the coordinated decision-making of the first CI system and the second CI system, thereby preserving privacy of the first CI system and the second CI system,
the coordinator module comprising a feasibility module (FM) and a prediction module (PM),
the FM being configured to:
  store the first set of decisions and each updated iteration thereof, and the second set of decisions and each updated iteration thereof;
  share the first set of decisions and each updated iteration thereof with the second RL module to inhibit the second RL module from generating an infeasible decision as part of any iteration of the second set of decisions; and
  share the second set of decisions and each updated iteration thereof with the first RL module to inhibit the first RL module from generating an infeasible decision as part of any iteration of the first set of decisions, and
the PM being configured to:
  generate an estimation of a maximum reward that is achievable for each iteration of the first set of decisions;
  generate an estimation of a maximum reward that is achievable for each iteration of the second set of decisions;
  share with the second RL the estimation of the maximum reward that is achievable for each iteration of the first set of decisions, such that the second RL optimizes an aggregated reward at each iteration of the second set of decisions by taking into account the estimation of the maximum reward that is achievable for a current iteration of the first set of decisions; and
  share with the first RL the estimation of the maximum reward that is achievable for each iteration of the second set of decisions, such that the first RL optimizes the aggregated reward at each iteration of the first set of decisions by taking into account the estimation of the maximum reward that is achievable for a current iteration of the second set of decisions.

2. The system according to claim 1, the first CI system being a power system.

3. The system according to claim 2, the second CI system being a road system.

4. The system according to claim 1, the second CI system being a road system.

5. The system according to claim 1,
  the aggregated reward being a summation of rewards achieved by the first RL and the second RL.

6. The system according to claim 5, the aggregated reward being determined using a modified version of Bellman's equation.

7. The system according to claim 1, the performing of steps b), f), i), and l) comprising using an ε-greedy approach.

8. The system according to claim 1, the predetermined amount of times in step o) being at least 10.

9. A method for advancing the restoration process for interdependent critical infrastructures (CIs) after a disaster, the method comprising:
  a) receiving first data from a first CI system affected by the disaster;
  b) generating a first set of decisions regarding a first restoration policy for the first CI system using a first reinforcement learning (RL) module;
  c) providing the first set of decisions to a coordinator module;
  d) receiving second data from a second CI system affected by the disaster, the second CI system having interdependency with the first CI system while being a completely different CI system than the first CI system;
  e) providing the first set of decisions from the coordinator module to a second RL module different from the first RL module;
  f) generating a second set of decisions regarding a second restoration policy for the second CI system using the second RL module, the generating of the second set of decisions taking into account the first set of decisions;
  g) providing the second set of decisions to the coordinator module;
  h) providing the second set of decisions from the coordinator module to the first RL module;
  i) generating an updated first set of decisions regarding the first restoration policy for the first CI system using the first RL module, the generating of the updated first set of decisions taking into account the second set of decisions;
  j) providing the updated first set of decisions to the coordinator module;
  k) providing the updated first set of decisions from the coordinator module to the second RL module;
  l) Generating an updated second set of decisions regarding the second restoration policy for the second CI system using the second RL module, the generating of the updated second set of decisions taking into account the updated first set of decisions;
  m) providing the updated second set of decisions to the coordinator module;
  n) providing the updated second set of decisions from the coordinator module to the first RL module;
  o) repeating steps i)-n) a predetermined amount of times, with each iteration of step i) taking into account the most recent updated second set of decisions and each iteration of step l) taking into account the most recent updated first set of decisions, resulting in a final first set of decisions for the first restoration policy for the first CI system and a final second set of decisions for the second restoration policy for the second CI system; and
  p) providing to restoration personnel the final first set of decisions and the final second set of decisions, allowing the restoration personnel to implement the first restoration policy for the first CI system and the second restoration policy for the second CI system; and
  q) physically restoring the first CI system based on the first restoration policy for the first CI system, and physically restoring the second CI system based on the second restoration policy for the second CI system,
the coordinator module being configured to facilitate information exchange between the first CI system and the second CI system, thereby enabling coordinated decision-making of the first CI system and the second CI system,
the coordinator module being further configured to minimize information sharing between the first CI system and the second CI system while still allowing for the coordinated decision-making of the first CI system and the second CI system, thereby preserving privacy of the first CI system and the second CI system,
the FM being configured to:
  store the first set of decisions and each updated iteration thereof, and the second set of decisions and each updated iteration thereof;
  share the first set of decisions and each updated iteration thereof with the second RL module to inhibit the second RL module from generating an infeasible decision as part of any iteration of the second set of decisions; and share the second set of decisions and each updated iteration thereof with the first RL module to inhibit the first RL module from generating an infeasible decision as part of any iteration of the first set of decisions, and the PM being configured to:

generate an estimation of a maximum reward that is achievable for each iteration of the first set of decisions;

generate an estimation of a maximum reward that is achievable for each iteration of the second set of decisions;

share with the second RL the estimation of the maximum reward that is achievable for each iteration of the first set of decisions, such that the second RL optimizes an aggregated reward at each iteration of the second set of decisions by taking into account the estimation of the maximum reward that is achievable for a current iteration of the first set of decisions; and share with the first RL the estimation of the maximum reward that is achievable for each iteration of the second set of decisions, such that the first RL optimizes the aggregated reward at each iteration of the first set of decisions by taking into account the estimation of the maximum reward that is achievable for a current iteration of the second set of decisions.

10. The method according to claim 9, the first CI system being a power system.

11. The method according to claim 10, the second CI system being a road system.

12. The method according to claim 9, the second CI system being a road system.

13. The method according to claim 9, the aggregated reward being a summation of rewards achieved by the first RL and the second RL.

14. The method according to claim 13, the aggregated reward being determined using a modified version of Bellman's equation.

15. The method according to claim 9, the performing of steps b), f), i), and l) comprising using an ε-greedy approach.

16. The method according to claim 9, the predetermined amount of times in step o) being at least 10.

17. A system for advancing the restoration process for interdependent critical infrastructures (CIs) after a disaster, the system comprising:

a processor; and a machine-readable medium in operable communication with the processor and having instructions stored thereon that, when executed by the processor, perform the following steps:

a) receiving first data from a first CI system affected by the disaster;

b) generating a first set of decisions regarding a first restoration policy for the first CI system using a first reinforcement learning (RL) module;

c) providing the first set of decisions to a coordinator module;

d) receiving second data from a second CI system affected by the disaster, the second CI system having interdependency with the first CI system while being a completely different CI system than the first CI system;

e) providing the first set of decisions from the coordinator module to a second RL module different from the first RL module;

f) generating a second set of decisions regarding a second restoration policy for the second CI system using the second RL module, the generating of the second set of decisions taking into account the first set of decisions;

g) providing the second set of decisions to the coordinator module;

h) providing the second set of decisions from the coordinator module to the first RL module;

i) generating an updated first set of decisions regarding the first restoration policy for the first CI system using the first RL module, the generating of the updated first set of decisions taking into account the second set of decisions;

j) providing the updated first set of decisions to the coordinator module;

k) providing the updated first set of decisions from the coordinator module to the second RL module;

l) Generating an updated second set of decisions regarding the second restoration policy for the second CI system using the second RL module, the generating of the updated second set of decisions taking into account the updated first set of decisions;

m) providing the updated second set of decisions to the coordinator module;

n) providing the updated second set of decisions from the coordinator module to the first RL module;

o) repeating steps i)-n) a predetermined amount of times, with each iteration of step i) taking into account the most recent updated second set of decisions and each iteration of step l) taking into account the most recent updated first set of decisions, resulting in a final first set of decisions for the first restoration policy for the first CI system and a final second set of decisions for the second restoration policy for the second CI system;

p) providing to restoration personnel the final first set of decisions and the final second set of decisions, allowing the restoration personnel to implement the first restoration policy for the first CI system and the second restoration policy for the second CI system; and q) physically restoring the first CI system based on the first restoration policy for the first CI system, and physically restoring the second CI system based on the second restoration policy for the second CI system, the coordinator module being configured to facilitate information exchange between the first CI system and the second CI system, thereby enabling coordinated decision-making of the first CI system and the second CI system, the coordinator module being further configured to minimize information sharing between the first CI system and the second CI system while still allowing for the coordinated decision-making of the first CI system and the second CI system, thereby preserving privacy of the first CI system and the second CI system, the first CI system being a power system, the second CI system being a road system, the coordinator module comprising a feasibility module (FM) and a prediction module (PM),

the FM being configured to:

store the first set of decisions and each updated iteration thereof, and the second set of decisions and each updated iteration thereof;

share the first set of decisions and each updated iteration thereof with the second RL module to inhibit the second RL module from generating an infeasible decision as part of any iteration of the second set of decisions; and share the second set of decisions and each updated iteration thereof with the first RL module to inhibit the first RL module from generating an infeasible decision as part of any iteration of the first set of decisions, the PM being configured to:

generate an estimation of a maximum reward that is achievable for each iteration of the first set of decisions;

generate an estimation of a maximum reward that is achievable for each iteration of the second set of decisions;

44 share with the second RL the estimation of the maximum reward that is achievable for each iteration of the first set of decisions, such that the second RL optimizes an aggregated reward at each iteration of the second set of decisions by taking into account the estimation of the maximum reward that is achievable for a current iteration of the first set of decisions; and share with the first RL the estimation of the maximum reward that is achievable for each iteration of the second set of decisions, such that the first RL optimizes the aggregated reward at each iteration of the first set of decisions by taking into account the estimation of the maximum reward that is achievable for a current iteration of the second set of decisions, the aggregated reward being a summation of rewards achieved by the first RL and the second RL, the aggregated reward being determined using a modified version of Bellman's equation, and the performing of steps b), f), i), and l) comprising using an $\varepsilon$-greedy approach.

* * * * *